(12) United States Patent
Park et al.

(10) Patent No.: US 9,749,996 B2
(45) Date of Patent: Aug. 29, 2017

(54) METHOD AND DEVICE FOR PERFORMING COORDINATED MULTI-POINT TRANSMISSION BASED ON SELECTION OF TRANSMISSION POINT

(71) Applicant: LG ELECTRONICS INC., Seoul (KR)

(72) Inventors: Jonghyun Park, Seoul (KR); Kijun Kim, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 14/893,899

(22) PCT Filed: Jul. 29, 2014

(86) PCT No.: PCT/KR2014/006931
§ 371 (c)(1),
(2) Date: Nov. 24, 2015

(87) PCT Pub. No.: WO2015/016575
PCT Pub. Date: Feb. 5, 2015

(65) Prior Publication Data
US 2016/0105882 A1 Apr. 14, 2016

Related U.S. Application Data

(60) Provisional application No. 61/859,762, filed on Jul. 29, 2013, provisional application No. 61/860,243, (Continued)

(51) Int. Cl.
*H04W 72/04* (2009.01)
*H04B 7/024* (2017.01)
(Continued)

(52) U.S. Cl.
CPC ........ *H04W 72/0406* (2013.01); *H04B 7/024* (2013.01); *H04L 5/0048* (2013.01);
(Continued)

(58) Field of Classification Search
None
See application file for complete search history.

(56) References Cited

U.S. PATENT DOCUMENTS 9,622,174 B2 * 4/2017 Kim ................. H04W 52/0212
2010/0177746 A1 7/2010 Gorokhov et al.
(Continued)

FOREIGN PATENT DOCUMENTS

KR 10-2012-0007526 A 1/2012
KR 10-2013-0050267 A 5/2013
(Continued)

*Primary Examiner* — Ajay Cattungal
(74) *Attorney, Agent, or Firm* — Birch, Stewart, Kolasch & Birch, LLP

(57) ABSTRACT

A method of performing, by means of a first transmission point, coordinated multi-point transmission based on the selection of a transmission point according to an embodiment of the present invention includes: selecting a second transmission point from among one or more candidate transmission points participating in the coordinated multi-point transmission; and transmitting a message to the second transmission point to request that the second transmission point transmits a physical downlink shared channel (PDSCH) to a terminal served by the first transmission point, wherein the message indicates a time duration for which the PDSCH is transmitted by the second transmission point.

19 Claims, 14 Drawing Sheets

Related U.S. Application Data filed on Jul. 30, 2013, provisional application No. 61/862,489, filed on Aug. 5, 2013.

(51) Int. Cl.
*H04L 5/00* (2006.01)
*H04W 76/04* (2009.01)
*H04W 92/20* (2009.01)

(52) U.S. Cl.
CPC ......... *H04L 5/0053* (2013.01); *H04W 76/046* (2013.01); *H04W 92/20* (2013.01)

(56) References Cited

U.S. PATENT DOCUMENTS

| | | | | |
|---|---|---|---|---|
| 2010/0271968 A1 | 10/2010 | Liu et al. | | |
| 2012/0113876 A1* | 5/2012 | Li | .......................... | H04L 1/1861 370/280 |
| 2012/0281645 A1* | 11/2012 | Li | .......................... | H04L 1/1829 370/329 |
| 2012/0307689 A1* | 12/2012 | Kim | ..................... | H04L 1/1861 370/280 |
| 2013/0028185 A1* | 1/2013 | Wu | ................... | H04W 56/0045 370/328 |
| 2013/0155915 A1* | 6/2013 | Park | .................... | H04W 72/042 370/280 |
| 2013/0215835 A1* | 8/2013 | Chen | ................ | H04W 72/0406 370/329 |
| 2014/0086127 A1* | 3/2014 | Kim | ........................ | H04L 5/001 370/311 |
| 2014/0126491 A1* | 5/2014 | Ekpenyong | ........... | H04L 5/0055 370/329 |
| 2014/0161060 A1* | 6/2014 | Nam | ..................... | H04L 5/0055 370/329 |
| 2014/0192738 A1* | 7/2014 | Nam | ....................... | H04L 5/001 370/329 |
| 2014/0334419 A1* | 11/2014 | Yang | .................... | H04L 1/1861 370/329 |
| 2015/0003302 A1* | 1/2015 | Ekpenyong | ........... | H04W 72/14 370/280 |
| 2015/0063259 A1* | 3/2015 | Gohari | ................. | H04W 28/20 370/329 |
| 2015/0245323 A1* | 8/2015 | You | ..................... | H04W 72/042 370/329 |

FOREIGN PATENT DOCUMENTS

| | | |
|---|---|---|
| KR | 10-1280459 B1 | 7/2013 |
| WO | WO 2012/120077 A1 | 9/2012 |
| WO | WO 2013/066205 A1 | 5/2013 |

\* cited by examiner (a) control-plane protocol stack (b) user-plane protocol stack (a)          (b)          (c)

(a)

(b)

(c)

(a)

(b)

METHOD AND DEVICE FOR PERFORMING COORDINATED MULTI-POINT TRANSMISSION BASED ON SELECTION OF TRANSMISSION POINT

CROSS REFERENCE TO RELATED APPLICATIONS

This application is the National Phase of PCT International Application No. PCT/KR2014/006931, filed on Jul. 29, 2014, which claims priority under 35 U.S.C. 119(e) to U.S. Provisional Application No. 61/859,762, filed on Jul. 29, 2013, 61/860,243, filed on Jul. 30, 2013, and 61/862,489 filed on Aug. 5, 2013, all of which are hereby expressly incorporated by reference into the present application.

TECHNICAL FIELD

The present invention relates to a wireless communication system, more particularly, to a method for multiple transmission points to coordinately transmit and receive data based on the selection of a transmission point and an apparatus therefor.

BACKGROUND ART

3GPP LTE (3rd generation partnership project long term evolution) and LTE-A (LTE-advanced) will now be described as an exemplary mobile communication system to which the present invention is applicable.

FIG. 1 illustrates E-UMTS (evolved universal mobile telecommunication system) as an exemplary mobile communication system. E-UMTS evolved from UMTS (universal mobile telecommunication system) is currently standardized in 3GPP. E-UMTS may be regarded as an LTE system. For technical specifications of UMTS and E-UMTS, reference can be made to Release 8 and Release 9 of "3rd Generation Partnership Project; Technical Specification Group Radio Access Network".

Referring to FIG. 1, E-UMTS includes a user equipment (UE), a base station (BS) and an access gateway (AG) located at the end of a network (E-UTRAN) and connected to an external network. The BS can simultaneously transmit multiple data streams for multicast service, and/or unicast service.

One or more cells are present in a BS. A cell is set to one of bandwidths of 1.25, 2.5, 5, 10, 15 and 20 MHz and provides downlink or uplink service to a plurality of UEs. Different cells may provide different bandwidths. The BS controls data transmission/reception to/from a plurality of UEs. The BS transmits downlink scheduling information about downlink data to the UE to inform the UE of a time/frequency region in which data will be transmitted, coding, data size, hybrid automatic repeat and request (HARM) related information, etc. In addition, the BS transmits uplink scheduling information about uplink data to the UE to inform the UE of a time frequency region that can be used by the UE, coding, data size, HARQ related information, etc. An interface for user traffic or control traffic transmission may be used between BSs. A core network (CN) may be composed of a network node for user registration of the AG and UE. The AG manages mobility of the UE for each tracking area (TA) composed of a plurality of cells.

While wireless communication technology has been developed to LTE on the basis of wideband code division multiple access (WCDMA), demands and expectations of users and service providers continuously increase. Furthermore, new wireless access technologies are continuously developed, and thus technical evolution is needed to achieve competitiveness. That is, reduction in cost per bit, service availability increase, flexible use of frequency bands, simple structure and open interface, appropriate power consumption of a UE, etc. are required.

DISCLOSURE OF THE INVENTION

Technical Task

A technical task of the present invention is to provide a method of efficiently performing CoMP transmission based on the selection of a transmission point in environment where a backhaul link among multiple transmission points has latency and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing coordinated multi-point, which is performed by a first transmission point based on transmission point selection, includes selecting a second transmission point from one or more candidate transmission points participating in the coordinated multi-point and transmitting a message for requesting to transmit physical downlink shared channel (PDSCH) to a user equipment served by the first transmission point to the second transmission point. In this case, the message may indicate a duration for which the PDSCH is transmitted by the second transmission point.

To further achieve these and other advantages and in accordance with the purpose of the present invention, according to a different embodiment, a method of performing coordinated multi-point, which is performed by a second transmission point based on transmission point selection, includes receiving at least a part of RRC configuration configured in a user equipment served by a first transmission point from the first transmission point, receiving a message for requesting to transmit physical downlink shared channel (PDSCH) to the user equipment from the first transmission point and transmitting the PDSCH to the user equipment based on the at least a part of the RRC configuration during a duration indicated by the message.

To further achieve these and other advantages and in accordance with the purpose of the present invention, according to a further different embodiment, a transmission point performing coordinated multi-point based on transmission point selection includes an RF (radio frequency) interface configured to transceive a radio signal with a user equipment served by the transmission point, a backhaul interface configured to transceive a backhaul link signal with one or more candidate transmission points participating in the coordinated multi-point, and a processor configured to control the backhaul interface to select a prescribed transmission point from the candidate transmission points and transmit a message for requesting to transmit physical downlink shared channel (PDSCH) to the user equipment to the prescribed transmission point. In this case, the message may indicate a duration for which the PDSCH is transmitted by the prescribed transmission point.

To further achieve these and other advantages and in accordance with the purpose of the present invention, according to a further different embodiment, a transmission point performing coordinated multi-point based on transmission point selection includes a backhaul interface configured to receive at least a part of RRC configuration configured in a user equipment served by a prescribed transmission point from the prescribed transmission point and receive a message for requesting to transmit physical downlink shared channel (PDSCH) to the user equipment from the prescribed transmission point and an RF (radio frequency) interface configured to transmit the PDSCH to the user equipment based on the at least a part of the RRC configuration during a duration indicated by the message.

Advantageous Effects

According to one embodiment of the present invention, it is able to efficiently perform CoMP transmission based on the selection of a transmission point in environment where a backhaul link among multiple transmission points has latency.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Also, the description of the eNB given above may be equally applied to a case in which a cell, an antenna port, an antenna port group, an RRH, a transmission point, a reception point, an access point, and a relay serve as a downlink transmit entity or an uplink receive entity with respect to the UE.

Protocol Stack

Figure 1:
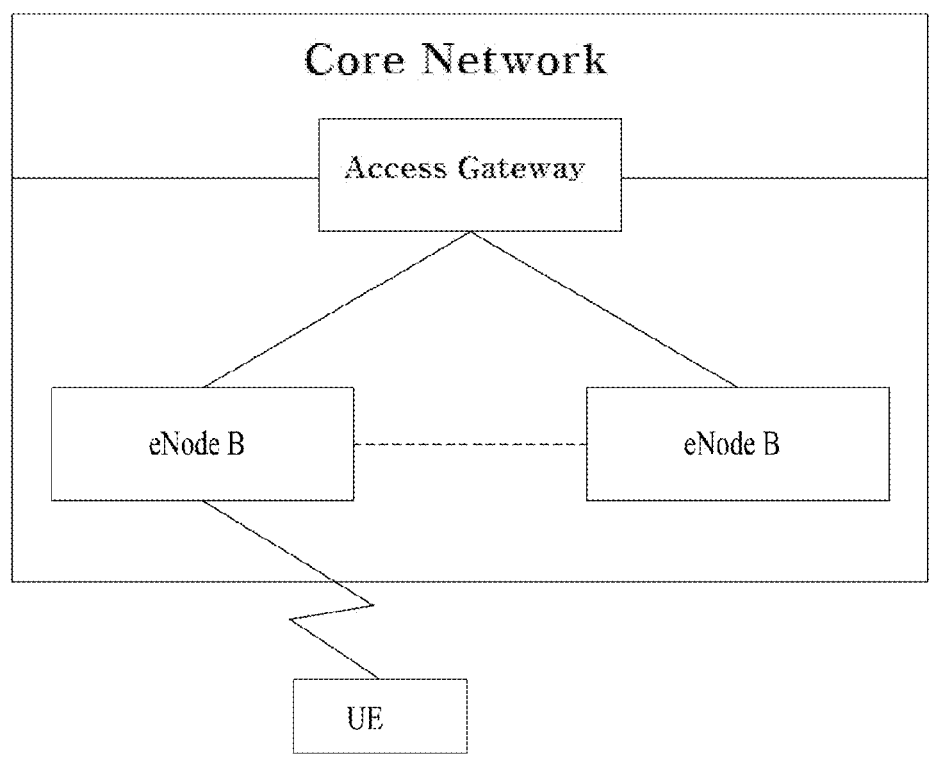
FIG. 1 illustrates E-UMTS network structure as an exemplary mobile communication system.
Figure 2:
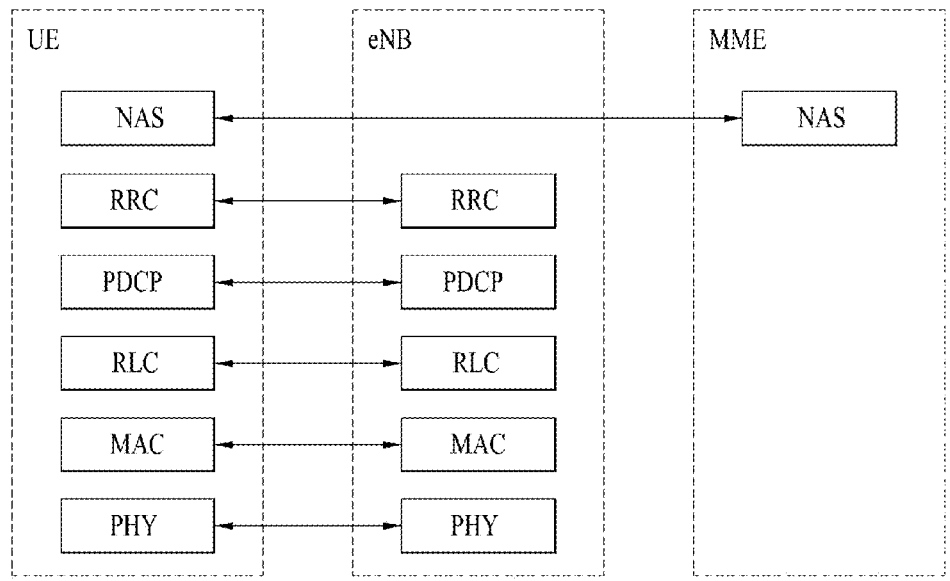
FIG. 2 shows a control plane and a user plane of a radio interface protocol between a UE and an E-UTRAN based on a 3GPP radio access network standard.
Figure 2:
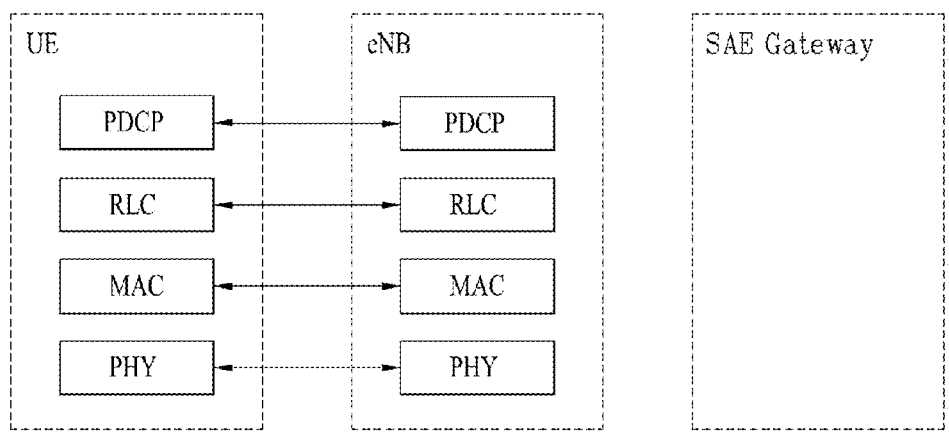

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages, which are used for managing a call between the UE and the network. The user plane refers to a path used for transmitting data generated in an application layer, e.g., voice data or Internet packet data.

A physical (PHY) layer of a first layer provides an information transfer service to an upper layer using a physical channel. The PHY layer is connected to a Medium Access Control (MAC) layer on an upper layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. In detail, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively narrow bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Physical Layer Procedure

Figure 3:
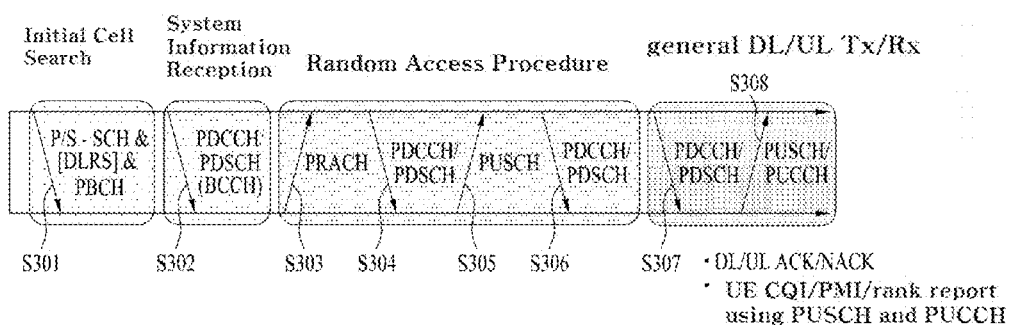
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel (PUSCH)/Physical Uplink Control Channel (PUCCH) transmission (S308) as a general uplink/downlink signal transmission procedure. The UE receives Downlink Control Information (DCI) via PDCCH. Here the DCI includes control information such as resource allocation information, and the format of the DCI can be determined according to usages.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Frame Structures

Figure 4:
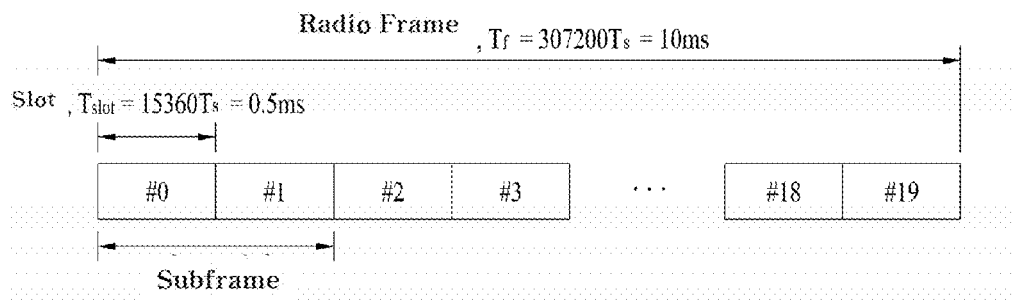
FIG. 4 is a diagram showing the architecture of a radio frame used in LTE system.

FIG. 4 is a diagram showing the architecture of a radio frame used in Long Term Evolution (LTE).

Referring to FIG. 4, the radio frame has a length of 10 ms (327200×Ts) and includes 10 subframes with the same size. Each of the subframes has a length of 1 ms and includes two slots. Each of the slots has a length of 0.5 ms (15360×Ts). Ts denotes a sampling time, and is represented by Ts=1/(15 kHz×2048)=3.2552×10-8 (about 33 ns). Each slot includes a plurality of OFDM symbols in a time domain, and includes a plurality of resource blocks (RBs) in a frequency domain. In the LTE system, one RB includes 12 subcarriers×7(6) OFDM symbols. A Transmission Time Interval (TTI) which is a unit time for transmission of data may be determined in units of one or more subframes. The architecture of the radio frame is only exemplary and the number of subframes included in the radio frame, the number of slots included in the subframe, or the number of OFDM symbols included in the slot may be variously changed.

Figure 5:
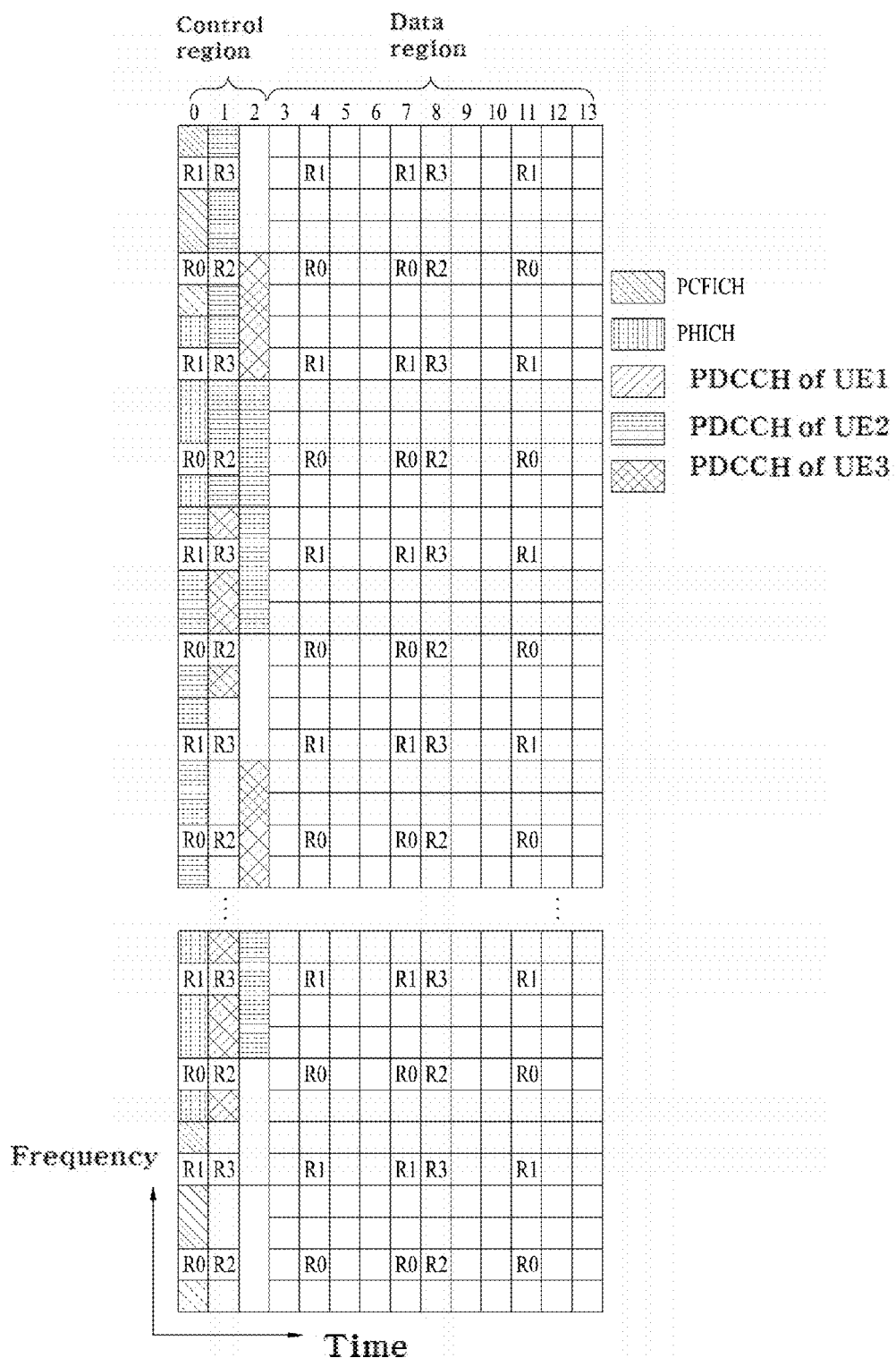
FIG. 5 is a diagram showing the architecture of a downlink radio frame used in LTE system.

FIG. 5 is a diagram showing a control channel included in the control region of the subframe.

Referring to FIG. 5, the subframe is composed of 14 OFDM symbols. According to the configuration of the subframe, the first one to three OFDM symbols are used as the control region and the remaining 13 to 11 OFDM symbols are used as the data region. In the drawing, R1 to R4 denote Reference Signals (RS) (or pilot signals) of antennas 0 to 3. The RS is fixed within the subframe with a constant pattern regardless of the control region and the data region. Control channels are resources, to which the RSs are not allocated, in the control region, and traffic channels are allocated to resources, to which the RSs are not allocated, in the data region. The control channels include a Physical Control Format Indicator Channel (PCFICH), a Physical Hybrid-ARQ Indicator Channel (PHICH), a Physical Downlink Control Channel (PDCCH), and the like.

The PCFICH informs the UE of the number of OFDM symbols used in the PDCCH for each subframe. The PCFICH is located at a first OFDM symbol and is set prior to the PHICH and the PDCCH. The PCFICH is composed of four Resource Element Groups (REGs), and the REGs are distributed within the control region based on a cell Identity (ID). One REG is composed of four Resource Elements (REs). The RE refers to a minimum physical resource defined by one subcarrier or one OFDM symbol. The architecture of the REG will be described in detail with reference to FIG. 7. The PCFICH value indicates a value of 1 to 3 or 2 to 4 according to a bandwidth and is modulated using a Quadrature Phase Shift Keying (QPSK) scheme.

The PHICH is used to transfer a HARQ ACK/NACK signal linked to uplink transmission. That is, the PHICH refers to a channel used for transmitting DL ACK/NACK information for UL HARQ. The PHICH is composed of one REG and is scrambled on cell-specific basis. The ACK/NACK signal is indicated by 1 bit and is modulated using a Binary Phase Shift Keying (BPSK) scheme. The modulated ACK/NACK signal is spread using a Spreading Factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain a diversity gain in a frequency domain and/or a time domain.

The PDCCH is allocated to first n OFDM symbols of the subframe. Here, n is an integer of 1 or more and is indicated by the PCFICH. The PDCCH is composed of one or more Control Channel Elements (CCEs), which will be described later in detail. The PDCCH informs UEs or a UE group of information associated with resource allocation of a Paging Channel (PCH) and a Downlink-Shared Channel (DL-SCH) of a transport channel, Uplink scheduling Grant, HARQ information or the like. The PCH and the DL-SCH are transmitted through the PDSCH. Accordingly, the eNB and the UE generally transmit and receive data through the PDSCH except for specific control information or specific service data.

Information indicating to which UE (one or a plurality of UEs) the data of the PDSCH is transmitted and how UEs receive and decode the data of the PDSCH is transmitted through the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, a UE located within a cell monitors a PDCCH using its own RNTI information, and if one or more UEs having "A" RNTI are present, the UEs receive the PDCCH and receive the PDSCH indicated by "B" and "C" through the information about the received PDCCH.

Figure 6:
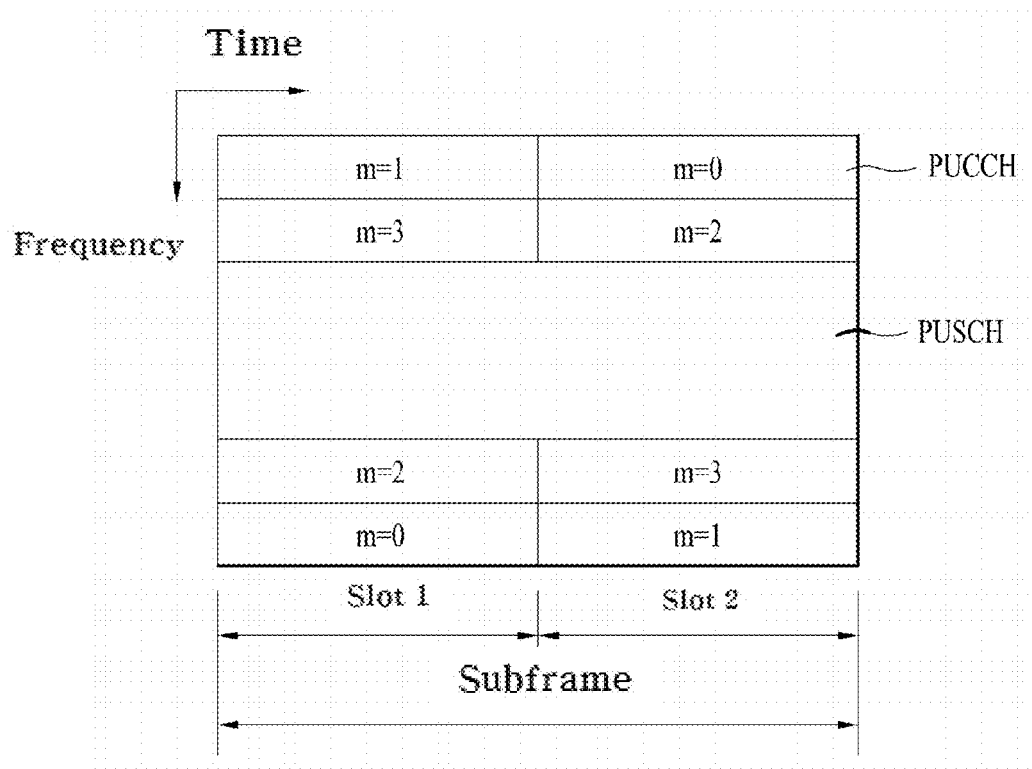
FIG. 6 is a diagram showing the architecture of an uplink subframe used in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE, uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

MIMO (Multi-Input Multi-Output)

Figure 7:
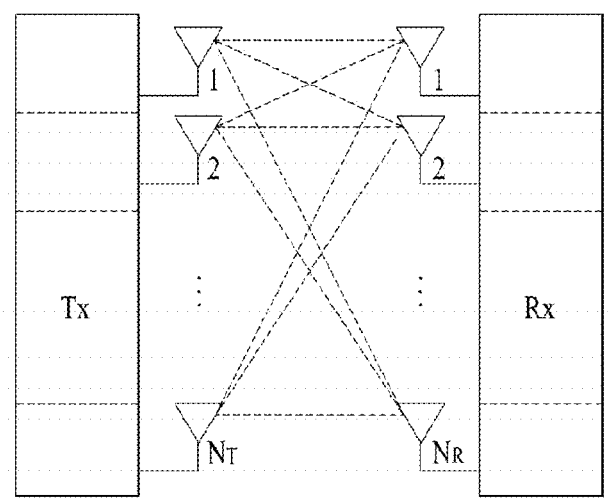
FIG. 7 is a diagram for a configuration of a general multi-antenna (MIMO) communication system.

A block diagram of a general multi-antenna (MIMO) communication system is depicted in FIG. 7.

$N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Equation 1. In this case, the $R_i$ is a smaller value of the $N_T$ and the $N_R$.

$$R_i = \min(N_T, N_R) \qquad \text{[Equation 1]}$$

For instance, MIMO communication system using 4 transmitting antennas and 4 receiving antennas may be able to theoretically obtain the transfer rate of 4 times of a single antenna system.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Equation 2.

$$s = [s_1, s_2, \ldots, s_{N_T}]^T \qquad \text{[Equation 2]}$$

Meanwhile, for each of the transmission informations $s_1$, $s_2$, . . . , $s_{N_T}$, a transmit power may be differentiated according to the each of the transmission informations. In this case, if each of the transmit powers is represented as $P_1$, $P_2$, . . . , $P_{N_T}$, transmit power-adjusted transmission information can be represented as a vector in the following Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

And, if ŝ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, let's consider a case that the NT number of transmission signal $x_1, x_2, \ldots, x_{N_T}$, which is practically transmitted, is configured in a manner of applying a weighted matrix W to the adjusted information vector Ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5. In this case, $W_{ij}$ means a weighting between an ith transmitting antenna and jth information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Equation 6.

number of streams≤rank(H)≤min($N_T$,$N_R$)      [Equation 6]

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

CA (Carrier Aggregation)

Before description is given of carrier aggregation, the concept of cell introduced to manage radio resources in LTE-A will be described first. A cell may be understood as a combination of downlink resources and uplink resources. Here, the uplink resource is not an essential element of the cell. Accordingly, a cell may include only downlink resources or include downlink resources and uplink resources. The downlink resource may be referred to as a downlink component carrier (DL CC), and the uplink resource may be referred to as an uplink component carrier (UL CC). The DL CC and the UL CC may be represented by carrier frequencies, and a carrier frequency represents a center frequency within the corresponding cell.

Cells may be divided into a primary cell (PCell), which operates at a primary frequency, and a secondary cell (SCell), which operates at a secondary frequency. The PCell and the SCell may be collectively referred to as a serving cell. A cell designated when the UE performs an initial connection establishment procedure or during a connection re-establishment procedure or a handover procedure, may serve as the PCell. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection, and SCell may be used for providing additional radio resources. In the carrier aggregation environment, all serving cells except the PCell may be viewed as SCells. In the case in which a UE is in an RRC_CONNECTED state but carrier aggregation is not established or in a case in which the UE does not support carrier aggregation, only a single serving cell consisting of PCells exists. On the other hand, in the case in which a UE is in the RRC_CONNECTED state and carrier aggregation is established therefor, one or more serving cells exist, and PCells and all SCells are included in all serving cells. For a UE supporting carrier aggregation, after an initial security activation procedure is initiated, the network may configure one or more SCells in addition to a PCell configured at the beginning of the connection establishment procedure.

Carrier aggregation is a technology that has been introduced to allow for use of a broader band in order to meet the requirements of a high-speed transmission rate. Carrier aggregation may be defined as an aggregation of two or more component carriers (CCs) having different carrier frequencies or an aggregation of two or more cells. Here the CCs may be consecutive in frequency domain, or may not be consecutive in frequency domain.

The UE may simultaneously receive and monitor downlink data from a plurality of DL CCs. A linkage between a DL CC and a UL CC may be indicated by the system information. The DL CC/UL CC link may be fixed in the system or may be semi-statically configured. Additionally, even if the entire system band consists of N CCs, the frequency band in which a specific UE can perform monitoring/reception may be limited to M(<N) CCs. Various parameters for carrier aggregation may be set up in a cell-specific, UE group-specific, or UE-specific manner.

Cross-carrier scheduling refers to, for example, including all downlink scheduling allocation information about a DL CC in the control region of another DL CC for one of multiple serving cells or including all uplink scheduling grant information about multiple UL CCs linked to a DL CC for one of multiple serving cells in the control region of the DL CC.

Regarding cross-carrier scheduling, a carrier indicator field (CIF) will be described first. The CIF may be included in the DCI format transmitted over the PDCCH (and be defined to have, for example, the size of 3 bits), or may not be included in the DCI format (in this case, the CIF may be defined to have, for example, the size of 0 bit). If the CIF is included in the DCI format, this indicates that cross-carrier scheduling is applied. In the case in which cross-carrier scheduling is not applied, the downlink scheduling allocation information is valid within the DL CC through which downlink scheduling allocation information is currently being transmitted. Additionally, the uplink scheduling grant is valid for a UL CC linked to the DL CC through which the downlink scheduling allocation information is transmitted.

In the case in which cross-carrier scheduling is applied, the CIF indicates a CC related to the downlink scheduling allocation information which is transmitted over the PDCCH in a DL CC. For example, referring to FIG. 11, downlink allocation information about DL CC B and DL CC C, i.e., information about PDSCH resources, is transmitted over the PDCCH within the control region of DL CC A. The UE may monitor DL CC A so as to recognize the resource region of the PDSCH and the corresponding CC through the CIF.

Whether or not the CIF is included in the PDCCH may be semi-statically set, and the CIF may be UE-specifically enabled by higher-layer signaling.

When the CIF is disabled, the PDCCH in a specific DL CC allocates a PDSCH resource in the same DL CC and may also allocate a PUSCH resource in a UL CC linked to the specific DL CC. In this case, the same coding scheme, CCE-based resource mapping, DCI format, and so on, as in the legacy PDCCH structure, may be applied.

When the CIF is enabled, the PDCCH in a specific DL CC may allocate a PDSCH/PUSCH resource within a single DL/UL CC indicated by the CIF, among the multiple aggregated CCs. In this case, a CIF may be additionally defined in the legacy PDCCH DCI format. The CIF may be defined as a field having a fixed length of 3 bits, or the CIF position may be fixed regardless of the size of the DCI format. The coding scheme, CCE-based resource mapping, DCI format, and so on of the legacy PDCCH structure may be applied to this case.

When the CIF exists, an eNB may allocate a DL CC set in which the PDCCH is to be monitored. Accordingly, the burden of blind decoding to the UE may be lessened. The PDCCH monitoring CC set corresponds to a portion of all aggregated DL CCs, and the UE may perform PDCCH detection/decoding only in the corresponding CC set. In other words, in order to perform PDSCH/PUSCH scheduling for a UE, the eNB may transmit the PDCCH only in the PDCCH monitoring CC set. The PDCCH monitoring CC set may be UE-specifically or UE group-specifically or cell-specifically configured. For example, when 3 DL CCs are aggregated as illustrated in FIG. 6, DL CC A may be configured as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDSCH of the DL CC A but also the PDSCH of the other DL CCs. In the case where the DL CC A is configured as the PDCCH monitoring CC, the PDCCH may not be transmitted in DL CC B and DL CC C.

CoMP (Coordinated Multi Point)

To satisfy enhanced system performance requirements for the 3GPP LTE-A system, CoMP transmission and reception technology (also called co-MIMO, collaborative MIMO or network MIMO) has been proposed. CoMP technology may increase performance of UEs located at a cell edge and average sector throughput.

In a multi-cell environment with a frequency reuse factor set to 1, the performance of a UE located at a cell edge and average sector throughput may be lowered due to inter-cell interference (ICI). To attenuate ICI, the legacy LTE system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than using fewer frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one point (of a CoMP cooperation unit) at a time. That is, one point transmits data to a single UE at a given time point, while the other points in the CoMP cooperation unit do not transmit data to the UE at the time point. A point to transmit data to a UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination among cells of the CoMP cooperation units.

In the case of uplink, CoMP reception refers to reception of a signal transmitted through cooperation among a plurality of geographically separated points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination among the cells of the CoMP unit.

With a CAMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly give each eNB a command to perform the cooperative MIMO operation.

As noted from the above description, it can be said that the CoMP system operates as a virtual MIMO system by grouping a plurality of cells into one group. Basically, the CoMP system may adopt a MIMO communication scheme employing multiple antennas.

Transmission Modes in LTE

In the following description, an example for a transmission mode of a downlink data channel is described. Currently, 3GPP LTE standard document, specifically, 3GPP TS 36. 213 document defines a transmission mode of a downlink data channel as shown in Table 1 in the following. The transmission mode is set to a user equipment via an upper layer signaling, i.e., RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity<br>MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity<br>MBSFN subframe: Single-antenna port, port 7 |
|  | DCI format 2D | Up to 8 layer transmission, ports 7-14 or single-antenna port, port 7 or 8 |

Referring to Table 1, current 3GPP LTE standard document includes a downlink control information (DCI) format, which is defined according to a type of RNTI masked on PDCCH. In particular, in case of a C-RNTI and an SPS C-RNTI, a transmission mode and a DCI format corresponding to the transmission mode (i.e., a transmission mode-based DCI format) are included in the document. And, a DCI format 1A for a Fall-back mode, which is capable of being applied irrespective of each transmission mode, is defined in the document. Table 1 shows an example of a case that a type of RNTI masked on PDCCH corresponds to a C-RNTI.

In Table 1, a transmission mode 10 indicates a downlink data channel transmission mode of the aforementioned CoMP transmission method. For instance, referring to Table 1, if a user equipment performs a blind decoding on PDCCH masked with C-RNTI and then detects a DCI format 2D, the user equipment decodes PDSCH in an assumption that the PDSCH has been transmitted with a multi-layer transmission scheme based on antenna port 7 to 14, i.e., DM-RS. Or, the user equipment decodes PDSCH in an assumption that the PDSCH has been transmitted with a single antenna transmission scheme based on DM-RS antenna port 7 or 8.

On the contrary, if the user equipment performs blind decoding on PDCCH masked with C-RNTI and then detects a DCI format 1A, a transmission mode varies according to whether a corresponding subframe corresponds to an MBSFN subframe. For instance, if the corresponding subframe corresponds to a non-MBSFN subframe, the user equipment decodes PDSCH in an assumption that the PDSCH has been transmitted with a single antenna transmission scheme based on a CRS of an antenna port 0 or a CRS-based transmit diversity scheme. And, if the corresponding subframe corresponds to an MBSFN subframe, the user equipment decodes the PDSCH in an assumption that the PDSCH has been transmitted with a single antenna transmission based on a DM-RS of an antenna port 7.

Transmit Power Control (TPC)

An uplink transmit power control (TPC) command from a base station can be defined in a DCI format of PDCCH. In the following, an example for a case of single antenna transmission is explained.

A base station can control uplink power by a closed-loop modification factor $\Delta$. In case of independently transmitting uplink shared channel (PUSCH) without PUCCH, transmit power of PUSCH can be performed according to Equation 7 in the following.

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad \text{[Equation 7]}$$

$P_{PUSCH}(i)$ corresponds to transmit power of $i^{th}$ subframe for PUSCH, $P_{CMAX}$ corresponds to maximum allowed power, $M_{PUSCH}(i)$ corresponds to an amount of allocated resource and $P_{O\_PUSCH}(j)$ corresponds to a signaled value. $\alpha(j) \cdot PL$ corresponds to a term for a path loss compensation. $\Delta TF(i)$ corresponds to a value configured by such a flag as deltaMCS-Enabled. $f(i)$ indicates closed-loop modification.

Meanwhile, power control for uplink control channel (PUCCH) can be defined as Equation 8 in the following. Contents capable of being inferred from explanation on Equation 7 can be omitted from explanation on Equation 8.

$$P_{PUCCH}(i) = \min\{P_{CMAX}, P_{O\_PUCCH} + PL + h(n_{CQI}, n_{HARQ}) + \Delta_{F\_PUCCH}(F) + g(i)\} \quad \text{[Equation 8]}$$

In Equation 8, $\Delta_{F\_PUCCH}(F)$ is provided by a higher layer and each value of the $\Delta F\_PUCCH$ (F) corresponds to a PUCCH format. $h(n_{CQI}, n_{HARQ})$ corresponds to a value subordinated to the PUCCH format. $n_{CQI}$ corresponds to a number information bot for channel quality information (CQI) and $n_{HARQ}$ corresponds to the number of HARQ (hybrid automatic repeat request) bit. Meanwhile, $P_{O\_PUCCH}$ corresponds to a parameter configured by a sum of P$_{O\_NOMINAL\_PUCCH}$(j) and P$_{O\_NOMINAL\_SPECIFIC}$(j). g(i) indicates closed-loop modification.

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\}$$ [Equation 9]

In Equation 9, P$_{SRS\_OFFSET}$ corresponds to a 4-bit UE-specific parameter which is semi-statically configured by a higher layer.

Reference Signals

Here after, a reference signal is explained.

In transmitting packets in a wireless communication system, the packets are transmitted over a radio channel, and therefore signal distortion may occur in the transmission process. For a receive entity to receive the correct signal in spite of signal distortion, the received distorted signal should be corrected using channel information. In detecting the channel information, a signal which is known to both the transmit entity and the receive entity is usually transmitted and the degree of distortion of the signal received over the channel is used to detect the channel information. This signal is referred to as a pilot signal or a reference signal.

When data is transmitted and received using multiple antennas, channel state between each Tx antenna and each Rx antenna needs to be recognized in order to receive a correct signal. Accordingly, a separate reference signal needs to be present per Tx antenna.

The RSs may be broadly divided into two types according to the purposes thereof. One type is used to acquire channel information and the other type is used for data demodulation. Since the former RS is used to allow the UE to acquire DL channel information, this RS should be transmitted over a wide band, and even a UE which does not receive DL data in a specific subframe should be receive and measure the RS. Such RS is also used for measurement of, for example, handover. The latter RS is sent when an eNB sends a resource on downlink. The UE may perform channel measurement by receiving this RS, thereby implementing data modulation. This RS should be transmitted in a region in which data is transmitted.

Cell/UE-Specific RS

Legacy 3GPP LTE systems (e.g., 3GPP LTE Release-8) define two types of downlink RSs for the unicast service. One is a common RS (CRS), and the other is a dedicated RS (DRS). The CRS is used for acquisition of information about the channel state and measurement of, for example, handover, and may be referred to as a cell-specific RS. The DRS is used for data demodulation, and may be referred to as a UE-specific RS. In the legacy 3GPP LTE systems, the DRS may be used only for data demodulation, and the CRS may be used for both acquisition of channel information and data demodulation.

The CRS is transmitted cell-specifically in every subframe in a wideband. The CRS may be transmitted with respect to up to four antenna ports depending on the number of Tx antennas of the eNB. For example, if the number of Tx antennas of the eNB is 2, CRSs for antenna ports #0 and #1 are transmitted. If the number of Tx antennas of the eNB is 4, CRSs for antenna ports #0 to #3 are respectively transmitted.

Figure 8:
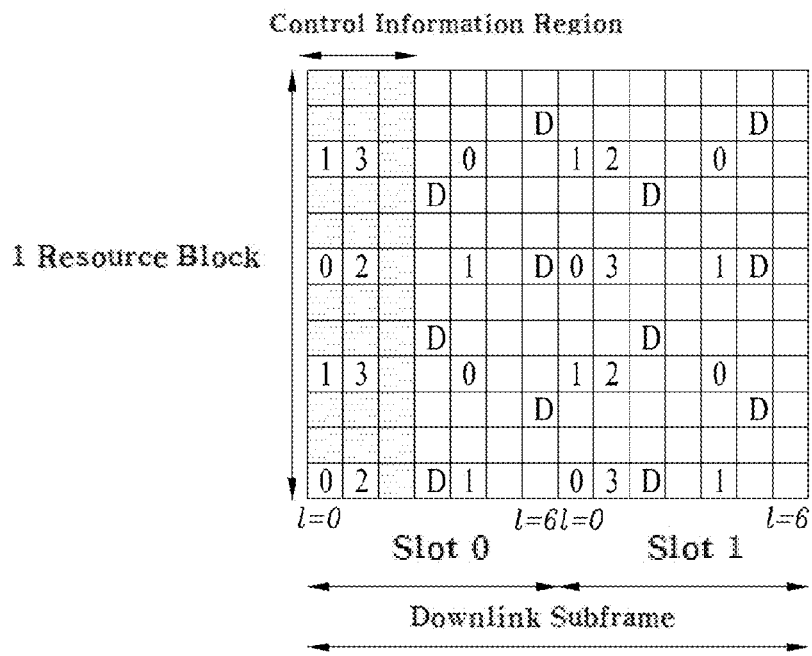
FIG. 8 and FIG. 9 are diagrams of a structure of a downlink reference signal in LTE system supportive of downlink transmission using 4 antennas.
Figure 9:
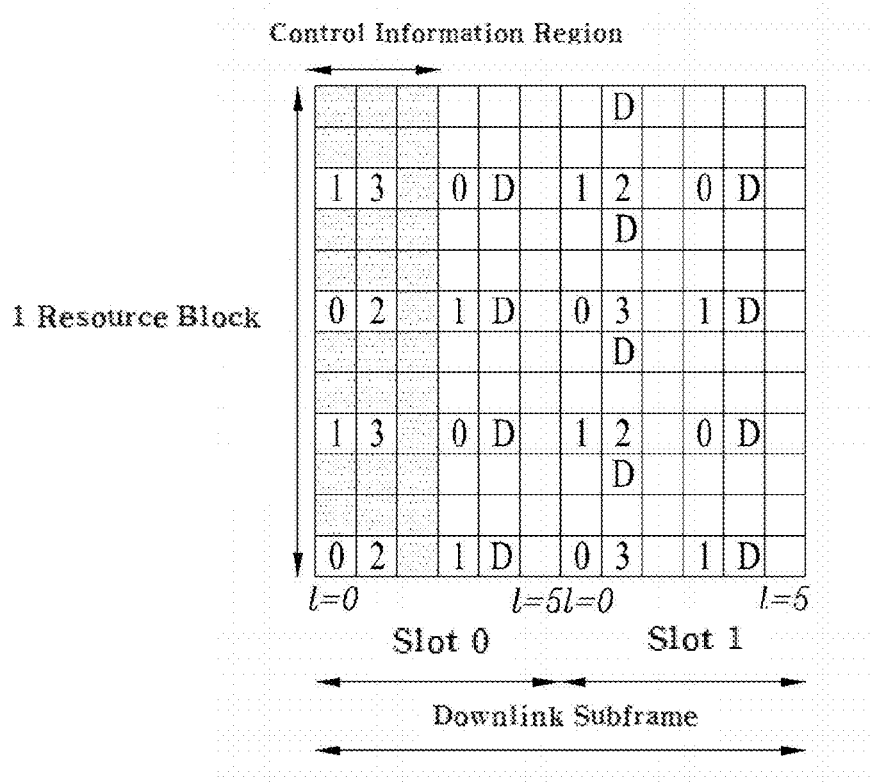

FIG. 8 and FIG. 9 are diagrams of a structure of a reference signal in LTE system supportive of downlink transmission using 4 antennas. In particular, FIG. 8 shows a case of a normal cyclic prefix and FIG. 9 shows a case of an extended cyclic prefix.

Referring to FIG. 8 and FIG. 9, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'D' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 8 and FIG. 9 show an example of the DM-RS corresponding to an antenna port 5. The DM-RSs corresponding to an antenna port 7 to 14, i.e., total 8 antenna ports, are also defined by 3GPP standard document 36.211.

LTE-A, which is an advanced version of LTE, can supports up to 8 Tx antennas on downlink. Accordingly, RSs for up to 8 Tx antennas need to be supported in LTE-A. In LTE, downlink RSs are defined only for up to 4 antenna ports. Therefore, if an eNB has 4 to 8 DL Tx antennas in LTE-A, RSs for these antenna ports need to be additionally defined. As the RSs for up to 8 Tx antenna ports, both the RS for channel measurement and the RS for data demodulation need to be considered.

One important consideration in designing an LTE-A system is backward compatibility. Backward compatibility refers to supporting the legacy LTE UE such that the legacy LTE UE normally operates in the LTE-A system. In terms of RS transmission, if RSs for up to 8 Tx antennas are added to a time-frequency region in which a CRS defined in the LTE standard is transmitted in every subframe over the full band, RS overhead excessively increases. Accordingly, in designing new RSs for up to 8 antenna ports, reducing RS overhead needs to be considered.

DMRS/CSI-RS

The new RSs introduced in LTE-A may be classified into two types. One is a channel state information-RS (CSI-RS) intended for channel measurement for selecting a transmission rank, a modulation and coding scheme (MCS), a precoding matrix index (PMI), and the like, and the other is a demodulation RS (DMRS) intended for demodulation of data transmitted through up to 8 Tx antennas.

The CSI-RS intended for channel measurement is designed only for channel measurement, unlike the existing CRS, which is used for data demodulation as well as for channel measurement and handover measurement. Of course, the CSI-RS may also be used for handover measurement. Since the CSI-RS is transmitted only in order to obtain information about channel states, the CSI-RS need not be transmitted in every subframe, unlike the CRS for the legacy LTE system. Accordingly, to reduce overhead of the CSI-RS, the CSI-RS may be designed to be intermittently (e.g., periodically) transmitted in the time domain.

When data is transmitted in a certain DL subframe, a dedicated DMRS is transmitted to a TIFF for which the data transmission is scheduled. That is, the DMRS may be referred to as a UE-specific RS. A DMRS dedicated to a specific UE may be designed to be transmitted only in a resource region in which the UE is scheduled, i.e., the time-frequency region in which data for the UE is transmitted.

Figure 10:
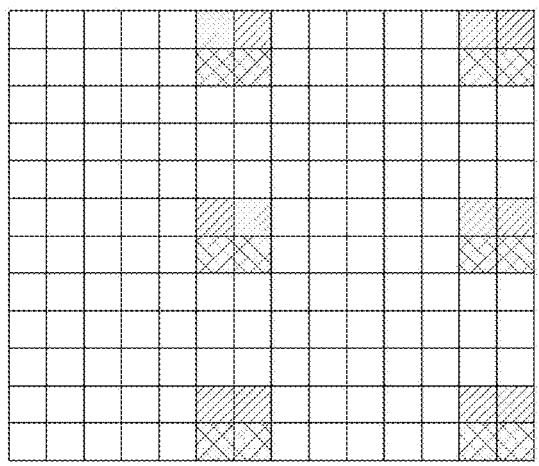
FIG. 10 illustrates an example of assigning a downlink DMRS currently defined in 3GPP standard document.

FIG. 10 illustrates an exemplary DMRS pattern defined in LTE-A.

FIG. 10 shows positions of REs for transmission of DMRSs on one RB pair (14 OFDM symbols in the time domain×12 subcarriers in the frequency domain in the case of normal CP) on which downlink data is transmitted. The DMRS may be transmitted with respect to four antenna ports (antenna port indexes 7, 8, 9 and 10) which are additionally defined in LTE-A. DMRSs for different antenna ports may be distinguished from each other as they are positioned on different frequency resources (subcarriers) and/or different time resources (OFDM symbols) (namely, they may be multiplexed using FDM and/or TDM). DMRSs for different antenna ports positioned on the same time-frequency resource may be distinguished from each other by an orthogonal code (namely, they may be multiplexed using the CDM scheme).

Referring to FIG. 10, DMRS corresponding to antenna port {7, 8, 11, 13} is mapped to DMRS group 1 using sequence per antenna port, DMRS corresponding to antenna port {9, 10, 12, 14} is mapped to DMRS group 4 using sequence per antenna port.

Figure 11:
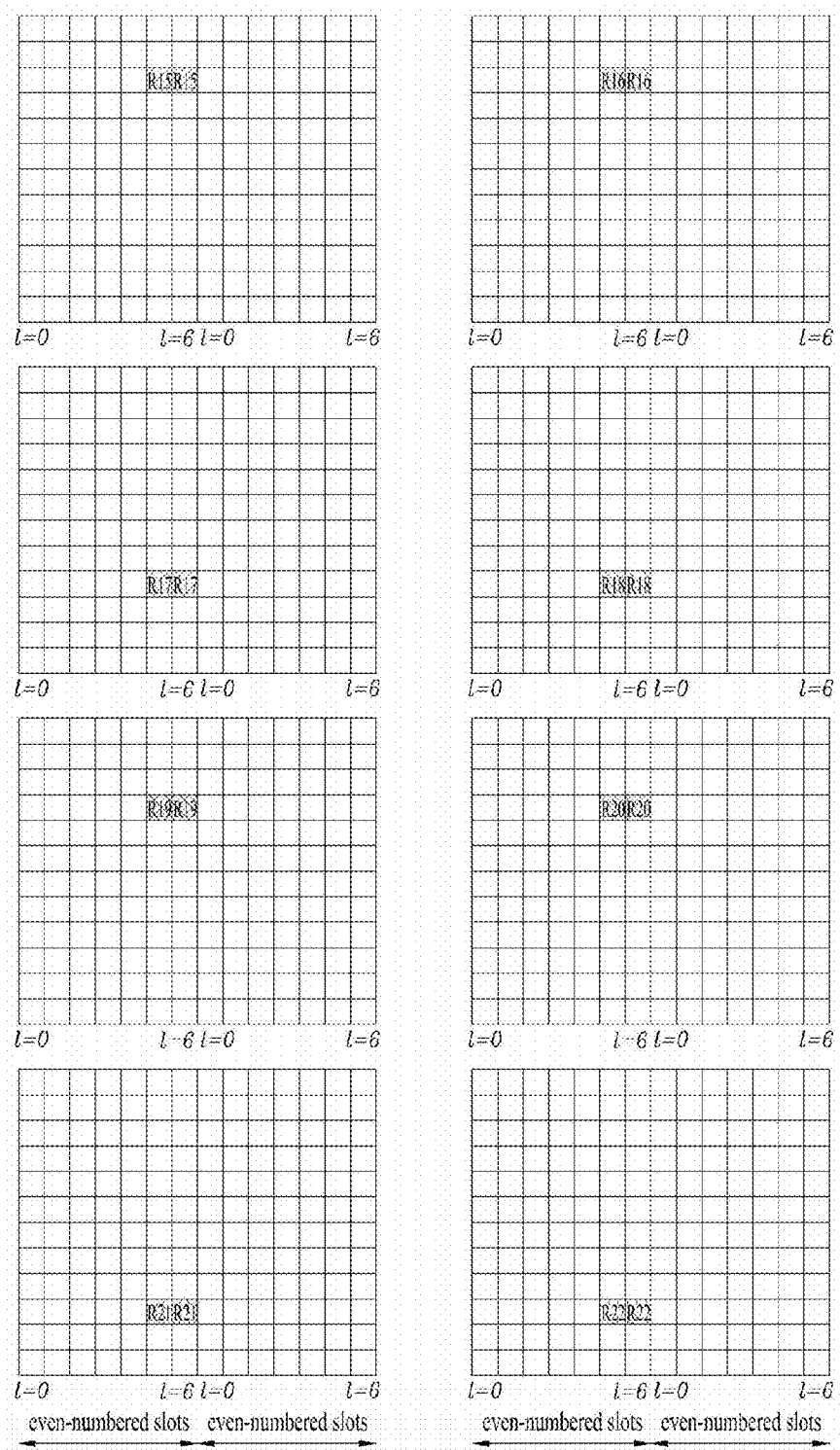
FIG. 11 illustrates an example of CSI-RS configuration #0 in case of a normal CP among downlink CSI-RS configurations currently defined in 3GPP standard document.

FIG. 11 is a diagram for examples of a CSI-RS pattern defined in LTE-A system.

FIG. 11 shows positions of REs for transmission of CSI-RSs on one RB pair (14 OFDM symbols in the time domain×12 subcarriers in the frequency domain in the case of normal CP) on which downlink data is transmitted. The CSI-RSs may be transmitted with respect to eight antenna ports (antenna port indexes 15, 16, 17, 18, 19, 20, 21 and 22) which are additionally defined in LTE-A. The CSI-RSs for different antenna ports may be distinguished from each other as they are positioned on different frequency resources (subcarriers) and/or different time resources (OFDM symbols) (namely, they may be multiplexed using FDM and/or TDM). CSI-RSs for different antenna ports positioned on the same time-frequency resource may be distinguished from each other by an orthogonal code (namely, they may be multiplexed using the CDM scheme). Meanwhile, the CSI-RS is proposed for the purpose of performing channel measurement for PDSCH irrespective of a CRS. Unlike the CRS, the CSI-RS can be defined by maximum 32 resource configurations different from each other to reduce inter-cell interference (ICI) in multi-cell environment.

The aforementioned CRS/DRS/DMRS/CSI-RS patterns are examples only. In case of applying various embodiments of the present invention, the present invention may be non-limited by a specific RS pattern. When a different RS pattern is defined and used, various embodiments of the present invention can also be identically applied.

CSI-RS Configuration

CSI-RS (resource) configuration varies according to the number of antenna ports. A CSI-RS is configured to be transmitted by different (resource) configurations between neighboring cells. Unlike the CRS, the CSI-RS supports maximum 8 antenna ports. According to 3GPP standard document, total 8 antenna ports (antenna port 15 to antenna port 22) are assigned as the antenna port for the CSI-RS. [Table 2] and [Table 3] list CSI-RS configurations defined in the 3GPP standard. Specifically, [Table 2] lists CSI-RS configurations in the case of a normal CP and [Table 3] lists CSI-RS configurations in the case of an extended CP.

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

In [Table 2] and [Table 3], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 4] lists CSI-RS subframe configurations defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Meanwhile, information about a Zero Power (ZP) CSI-RS is transmitted in a CSI-RS-Config-r10 message configured by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 4]. zeroTxPowerResourceConfigList-r10 indicates a ZP CSI-RS configuration. The elements of this bitmap indicate the respective configurations written in the columns for four CSI-RS antenna ports in [Table 2] or [Table 3]. A general CSI-RS that is not the ZP CSI-RS is referred to as a non zero-power (NZP) CSI-RS.

Contrary to the CRS transmitted in all subframes in which a PDSCH can be transmitted, the CSI-RS may be configured to be transmitted only in some subframes. For example, CSI subframe sets $C_{CSI,0}$ and $C_{CSI,1}$ may be configured by a higher layer. CSI reference resource (i.e., a predetermined resource region forming the basis of CSI calculation) may belong to either $C_{CSI,0}$ or $C_{CSI,1}$, may not belong to both $C_{CSI,0}$ and $C_{CSI,1}$ at the same time. Accordingly, when CSI subframe sets $C_{CSI,0}$ and $C_{CSI,1}$ are configured by a higher layer, the UE is not allowed to expect that it will receive a trigger (or an indication for CSI calculation) for a CSI reference resource which is present in a subframe which belongs to none of the CSI subframe sets.

Alternatively, the CSI reference resource may be configured in a valid downlink subframe. The valid downlink subframe may configured as subframe satisfying various conditions. In the case of periodic CSI reporting, one of the conditions may be a subframe belonging to a CSI subframe set that is linked to periodic CSI reporting when a CSI subframe set is configured for the UE.

The UE may derive a CQI index from the CSI reference resource in consideration of the following assumptions (For details, see 3GPP TS 36.213).

First three OFDM symbols in a subframe are occupied by control signaling.

No REs are used by a primary synchronization signal, a secondary synchronization signal, or a physical broadcast channel (PBCH).

CP length of a non-Multicast Broadcast Single Frequency Network (MBSFN) subframe.

Redundancy version is 0.

If a CSI-RS is used for channel measurement, the ratio of PDSCH energy per resource element (EPRE) to CSI-RS EPRE conforms to a predetermined rule.

For CSI reporting in transmission mode 9 (i.e., the mode supporting up to 8-layer transmission), if the UE is configured for PMI/RI reporting, it is assumed that DMRS overhead corresponds to the most recently reported rank. For example, in the case of two or more antenna ports (i.e., rank less than or equal to 2) as described in FIG. 7, DMRS overhead on one RB pair is 12 REs, whereas DMRS overhead in the case of three or more antenna ports (i.e., rank greater than or equal to 3) is 24 REs. Therefore, a CQI index may be calculated on the assumption of DMRS overhead corresponding to the most recently reported rank value.

No REs are allocated to a CSI-RS and a zero-power CSI-RS.

No REs are allocated to a positioning RS (PRS).

The PDSCH transmission scheme conforms to a transmission mode currently set for the UE (the mode may be a default mode).

The ratio of PDSCH EPRE to cell-specific RS EPRE conforms to a predetermined rule.

The eNB may inform UEs of such a CSI-RS configuration through, for example, radio resource control (RRC) signaling. That is, information about the CSI-RS configuration may be provided to UEs in a cell using dedicated RRC signaling. For example, while a UE establishes a connection with the eNB through initial access or handover, the eNB may inform the UE of the CSI-RS configuration through RRC signaling. Alternatively, when the eNB transmits, to a UE, an RRC signaling message demanding channel state feedback based on CSI-RS measurement, the eNB may inform the UE of the CSI-RS configuration through the RRC signaling message.

When the aforementioned CoMP scheme is applied, a UE may be configured with a plurality of CSI-RS settings through an RRC layer signal. Each CSI-RS configuration is defined according to Table 5 below. As seen from Table 5, each CSI-RS setting contains information about CRS that can be quasi co-location (QCL) assumed.

TABLE 5

| CSI-RS-ConfigNZP information elements | |
|---|---|
| -- ASN1START | |
| CSI-RS-ConfigNZP-r11 ::= | SEQUENCE { |
|     csi-RS-ConfigNZPId-r11 | CSI-RS-ConfigNZPId-r11, |
|     antennaPortsCount-r11 | ENUMERATED {an1, an2, an4, an8}, |
|     resourceConfig-r11 | INTEGER (0..31) |
|     subframeConfig-r11 | INTEGER (0..154) |
|     scramblingIdentity-r11 | INTEGER (0..503), |
|     qrl-CRS-Info-r11 | SEQUENCE { |
|         qcl-ScramblingIdentity-r11 | INTEGER (0..503), |
|         crs-PortsCount-r11 | ENUMERATED {n1, n2, n4, spare1}, |
|         mbsfn-SubframeConfigList-r11 | CHOICE { |

TABLE 5-continued

CSI-RS-ConfigNZP information elements

```
            release           NULL,
            setup             SEQUENCE {
                subframeConfigList    MBSFN-SubframeConfigList
            }
        }                                              OPTIONAL    -- Need ON
    }                                                  OPTIONAL,   -- Need OR
    ...
}
-- ASN1STOP
```

PQI (PDSCH RE Mapping and Quasi-Co-Location Indicator)

Recently, the 3GPP LTE-A standard has defined a PDSCH RE Mapping and Quasi-Co-Location Indicator (PQI) in DCI format 2D for transmission mode 10 that is a CoMP method of PDSCH transmission. In detail, the PQI field is defined with a 2-bit size and indicates 4 of total states according to Table 6 below, information indicated by each state is a parameter set for reception of the CoMP method of PDSCH, and detailed values of the information is pre-signaled via a higher layer. That is, for Table 6 below, four of total parameter sets may be semi-statically signaled via an RRC layer signal and a DCI format 2D of a PQI field dynamically indicates one of the four of total parameter sets.

TABLE 6

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Information included in the parameter set includes one of the number of CRS antenna ports (crs-PortsCount), a CRS frequency shift value (crs-FreqShift), MBSFN subframe configuration (mbsfn-SubframeConfigList), ZP CSI-RS configuration (csi-RS-ConfigZPId), PDSCH start symbol (pdsch-Start), NZP (Non-ZP) CSI-RS QCL (Quasi Co-Location) information, and (qcl-CSI-RS-ConfigNZPId) information.

QCL (Quasi Co-Location)

In the following, QCL (Quasi Co-Location) between antenna ports is explained.

QCL between antenna ports indicates that all or a part of large-scale properties of a signal (or a radio channel corresponding to a corresponding antenna port) received by a user equipment from a single antenna port may be identical to large-scale properties of a signal (or a radio channel corresponding to a corresponding antenna port) received from a different single antenna port. In this case, the larger-scale properties may include Doppler spread related to frequency offset, Doppler shift, average delay related to timing offset, delay spread and the like. Moreover, the larger-scale properties may include average gain as well.

According to the aforementioned definition, a user equipment cannot assume that the large-scale properties are identical to each other between antenna ports not in the QCL, i.e., NQCL (Non Quasi co-located) antenna ports. In this case, the user equipment should independently perform a tracking procedure to obtain frequency offset, timing offset and the like according to an antenna port.

Meanwhile, in LTE system, when a downlink signal is transmitted in a transmission mode 10 corresponding to a CoMP mode, it is defined as a base station sets either a QCL type A or a QCL type B to a UE via a higher layer signal. If the QCL type A is set to the UE, the UE assumes that antenna port index 0 to 3 (i.e., CSR antenna port) of a serving cell, antenna port index 7 to 14 (i.e., UE-specific RS antenna port) and antenna port index 15 to 22 (i.e., CSI-RS antenna port) are QCL with delay spread, Doppler spread, Doppler shift and average delay.

If the QCL type B is set to the UE, the UE assumes that antenna port index 15 to 22 corresponding to a CSI-RS resource configuration, which is identified by NZP (non-zero power) CSI-RS configuration information (qcl-CSI-RS-ConfigNZPId-r11) given by higher layer, (i.e., CSI-RS antenna port) and antenna port index 7 to 14 associated with PDSCH (i.e., UE-specific RS antenna port) are QCL with Doppler shift, Doppler spread, average delay and delay spread.

A UE to which the QCL type B is set determines PDSCH RE mapping using a parameter set indicated by a PQI field of a DCI format 2D of detected PDCCH/EPDCCH and can determine PDSCH AP QCL.

Channel State Information (CSI)

MIMO schemes may be classified into open-loop MIMO and closed-loop MIMO. In open-loop MIMO, a MIMO transmitter performs MIMO transmission without receiving CSI feedback from a MIMO receiver. In closed-loop MIMO, the MIMO transmitter receives CSI feedback from the MIMO receiver and then performs MIMO transmission. In closed-loop MIMO, each of the transmitter and the receiver may perform beamforming based on the CSI to achieve a multiplexing gain of MIMO Tx antennas. To allow the receiver (e.g., a UE) to feed back CSI, the transmitter (e.g., an eNB) may allocate a UL control channel or a UL-SCH to the receiver.

The UE may perform estimation and/or measurement of a downlink channel using a CRS and/or a CSI-RS. The CSI fed back to the eNB by the UE may include a rank indicator (RI), a precoding matrix indicator (PMI), and a channel quality indicator (CQI).

The RI is information about a channel rank. The channel rank represents the maximum number of layers (or streams) that can carry different pieces of information in the same time-frequency resources. Since the rank is determined mainly according to long-term fading of a channel, the RI may be fed back with a longer periodicity (namely, less frequently) than the PMI and the CQI.

The PMI is information about a precoding matrix used for transmission from a transmitter and has a value reflecting the spatial characteristics of a channel. Precoding refers to mapping transmission layers to Tx antennas. A layer-antenna mapping relationship may be determined by the precoding matrix. The PMI corresponds to an index of a precoding matrix of an eNB preferred by the UE based on a metric such as signal-to-interference-plus-noise ratio (SINR). In order to reduce the feedback overhead of precoding information, the transmitter and the receiver may pre-share a codebook including multiple precoding matrices, and only the index indicating a specific precoding matrix in the codebook may be fed back. For example, the PMI may be determined based on the most recently reported RI.

The CQI is information indicating channel quality or channel strength. The CQI may be expressed as a predetermined MCS combination. That is, a CQI index that is fed back indicates a corresponding modulation scheme and code rate. The CQI may configure a specific resource region (e.g., a region specified by a valid subframe and/or a physical RR) as a CQI reference resource and be calculated on the assumption that PDSCH transmission is present on the CQI reference resource, and the PDSCH can be received without exceeding a predetermined error probability (e.g., 0.1). Generally, the CQI has a value reflecting a received SINR which can be obtained when the eNB configures a spatial channel using a PMI. For instance, the CQI may be calculated based on the most recently reported RI and/or PMI.

In a system supporting an extended antenna configuration (e.g., an LTE-A system), additional acquisition of multi user (MU)-MIMO diversity using an MU-MIMO scheme is considered. In the MU-MIMO scheme, when an eNB performs downlink transmission using CSI fed back by one UE among multiple users, it is necessary to prevent interference with other UEs because there is an interference channel between UEs multiplexed in the antenna domain. Accordingly, CSI of higher accuracy than in a single-user (SU)-MIMO scheme should be fed back in order to correctly perform MU-MIMO operation.

A new CSI feedback scheme may be adopted by modifying the existing CSI including an RI, a PMI, and a CQI so as to measure and report more accurate CSI. For example, precoding information fed back by the receiver may be indicated by a combination of two PMIs (e.g., i1 and i2). Thereby, more precise PMI may be fed back, and more precise CQI may be calculated and reported based on such precise PMI.

Meanwhile, the CSI may be periodically transmitted over a PUCCH and or aperiodically transmitted over a PUSCH. For the RI, various reporting modes may be defined depending on which of a first PMI (e.g., W1), a second PMI (e.g., W2), and a CQI is fed back and whether the PMI and/or CQI that is fed back relates to a wideband (WB) or a subband (SB).

CQI Computation

Hereinafter, CQI calculation will be described in detail on the assumption that the downlink receiver is a UE. However, the description of the present invention given below may also be applied to a relay station serving to perform downlink reception.

A description will be given below of a method for configuring/defining a resource (hereinafter, referred to as a reference resource) forming the basis of calculation of the CQI when the UE reports CST, The CQI is more specifically defined below.

A CQI that the UE reports corresponds to a specific index value. The CQI index has a value indicating a modulation technique, code rate, and the like that correspond to the channel state. For example, CQI indexes and anaylized meanings thereof may be given as shown in Table 7 below.

TABLE 7

| CQI index | Modulation | Code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 1 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on an observation which is not restricted by time and frequency, the UE may determine the highest CQI index satisfying a predetermined requirement among CQI indexes 1 to 15 of Table 3 with respect to each CQI value reported in uplink subframe n. The predetermined requirement may be that a single PDSCH transmission block which has a combination of a modulation scheme (e.g., MCS) and a transmission block size (TBS) corresponding to the CQI index and occupies a group of downlink physical RBs called a CQI reference resource should be received with a transmission block error probability not exceeding 0.1 (i.e., 10%). If even CQI index 1 does not satisfy the aforementioned requirement, the UE may determine CQI index 0.

In transmission mode 9 (corresponding to transmission of up to 8 layers) and the feedback reporting mode, the UE may perform channel measurement for calculation of the CQI value reported in uplink subframe n based only on the CSI-RS. In the other transmission modes and corresponding reporting modes, the UE may perform channel measurement for CQI calculation based on the CRS.

If all requirements given below are satisfied, a combination of a modulation scheme and a TBS may correspond to one CQI index. That is, the combination should be allowed to be signaled on a PDSCH in a CQI reference resource according to an associated TRS table, the modulation scheme should be indicated by a corresponding CQI index, and when the combination of a TBS and a modulation scheme is applied to the reference resource, a valid channel code rate as close to the code rate indicated by the CQI index as possible should be given. If two or more combinations of a TBS and a modulation scheme are almost equal to the code rate indicated by the corresponding CQI index, a combination having the smallest TBS may be determined.

A CQI reference resource is defined as the following.

In the frequency domain, the CQI reference resource defined as a group of downlink physical RBs corresponds to a band associated with the derived CQI value.

In the time domain, the CQI reference resource is defined as a single downlink subframe n-nCQI_ref. In the case of periodic CQI reporting, nCQI_ref is determined to have a value that is smallest among the values greater than or equal to 4 and corresponds to a downlink subframe in which downlink subframe n-nCQI_ref is valid. In the case of aperiodic CQI reporting, a downlink subframe identical to a valid downlink subframe corresponding to a CQI request in an uplink DCI format (namely, the PDCCH DCI format for providing the UE with uplink scheduling control information) (or having a received CQI request) is determined as a CQI reference resource for nCQI_ref. In aperiodic CQI reporting, nCQI_ref may be 4, and downlink subframe n-nCQI_ref may correspond to a valid downlink subframe. Herein, downlink subframe n-nCQI_ref may be received after a subframe corresponding to a CQI request in a random access response grant (or having a received CQI request). The valid downlink subframe refers to a downlink subframe that is configured for the UE, is not set as a MBSFN subframe except in transmission mode 9, and neither includes a DwPTS field if the length of DwPTS is less than or equal to 7680*Ts (Ts=1/(15000×2048) seconds), nor belongs to a measurement gap configured for the UE. If there is no valid downlink subframe for the CQI reference resource, CQI reporting is not performed in uplink subframe n.

In the layer region, the CQI reference resource is defined as a RI and PMI which the CQI presumes.

The following assumptions may be made for the UE to derive a CQI index on a CQI reference resource: (1) the first three OFDM symbols in a downlink subframe are used for control signaling; (2) there is no RE that is used by a primary synchronization signal, a secondary synchronization signal, or a PBCH; (3) CP length of a non-MBSFN subframe is given; (4) Redundancy version is 0; (5) If a CSI-RS is used for channel measurement, the ratio of PDSCH energy per resource element (EPRE) to CSI-RS EPRE has a predetermined value signaled by a higher layer; (6) a PDSCH transmission scheme (single antenna port transmission, transmission diversity, spatial multiplexing, MU-MIMO, etc.) defined for each transmission mode (e.g., a default mode) is currently set for the UE; (7) if the CRS is used for channel measurement, the ratio of PDSCH EPRE to CRS EPRE may be determined according to a predetermined requirement. For details related to definition of the CQI, see 3GPP TS 36.213.

In summary, the downlink receiver (e.g., a UE) may configure a specific single subframe of the past as a CQI reference resource with respect to the current time at which it is performing CQI calculation, and when a PDSCH is transmitted from the eNB on the CQI reference resource, may calculate a CQI value such that a condition that the error probability should not exceed 10% is satisfied.

CSI-Process

Meanwhile, 3GPP standard document has introduced such a concept as a CSI process including a combination of an NZP CSI-RS resource for signal measurement and a CSI-IM resource for interference measurement to make a feedback on a CSI of a UE.

Specifically, a CSI process is defined by an association between an NZP CSI-RS resource for measuring a preferred signal and an interference measuring resource (IMR) for measuring interference. Each CSI process has an independent CSI feedback configuration. The independent CSI feedback configuration means a feedback mode (an order of transmitting a certain type of CSI (RI, PMI, CQI, etc.)), a feedback interval, an offset and the like.

One or more CSI-IM resource configurations can be given to a UE. Higher layer parameters such as a ZP (zero power) CSI-RS configuration (i.e., configuration information on an RE position to which a ZP CSI-RS is mapped) and a ZP CSI-RS subframe configuration (i.e., an interval of generating a ZP CSI-RS and configuration information on an offset) can be set to each of the CSI-IM resource configurations.

And, one or more ZP CSI-RS resource configurations can be given to a UE. Higher layer parameters such as a ZP CSI-RS configuration list (i.e., 16-bit bitmap information on a ZP CSI-RS) and a ZP CSI-RS subframe configuration (i.e., an interval of generating a ZP CSI-RS and configuration information on an offset) can be set to each of the ZP CSI-RS resource configurations.

And, a UE can deliver the number (P) of CSI processes capable of being maximally supported by the UE to an eNB in a manner of including the number in UE capability signaling. The UE can transmit a single value of the P selected from the group consisting of 1, 2 and 3 to the eNB.

If the UE delivers P=1 to the eNB as capability of the UE, it indicates that the UE is able to process a single CSI process only. Although a transmission mode corresponds to a transmission mode 10, it may indicate that a DPS operation is impossible and it is able to mainly expect an accuracy enhancement effect of interference measurement by utilizing a CSI-IM. If the UE delivers P=3 or P=4 to the eNB as the capability of the UE, it indicates that the UE is able to set multiple CSI processes. In this case, the UE is able to perform a DPS operation in a manner of receiving a CSI process information element from higher layer and performing CSI feedback according to each CSI process.

Figure 12:
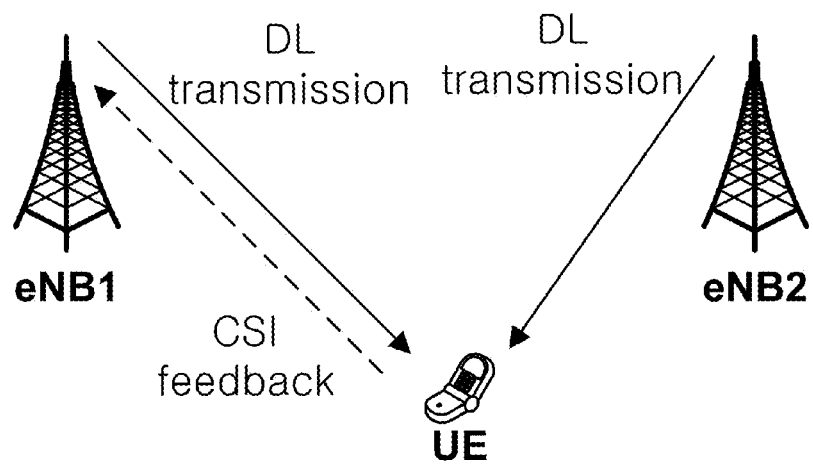
FIG. 12 illustrates an example of a downlink CoMP operation.

FIG. 12 shows an example of a downlink CoMP operation. A UE is positioned between an eNB1 and an eNB 2. The two eNBs perform a CoMP operation (JT, DCS, DPB, CS/CB, etc.) to solve an interference problem influencing on the UE. In order to support the CoMP operation of the eNB1 and the eNB2, the UE makes a feedback on a CSI. The feedback on the CSI includes CSI information of each eNB, e.g., RI information, PMI information and CQI information. In addition, the feedback on the CSI may include channel information between the two eNBs (e.g., phase offset information between channels of the two eNBs) for JT.

The UE transmits the CSI feedback to the eNB1 corresponding to a serving cell of the UE. According to one embodiment, the UE may transmit the CSI feedback to the eNB2 only or transmit the CSI feedback to both the eNB1 and the eNB2. Although a base unit of participating in CoMP is explained as an eNB, the CSI feedback can also be applied to CoMP between transmission points (TPs) controlled by a single eNB. For CoMP schedule, the UE makes a feedback on not only downlink (DL) CSI information of a serving eNB/TP but also DL CSI information of a neighboring eNB/TP participating in CoMP. To this end, the UE makes a feedback on a plurality of CSI processes to which various data transmitting eNBs/TPs and various interference environments are reflected. For example, the UE may receive a configuration of three CSI processes shown in Table 8 in the following.

TABLE 8

| CSI process | Signal measurement resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 8, a CSI-RS 0 is received from the eNB 1 corresponding to a serving eNB and a CSI-RS 1 is received from the eNB2 participating in CoMP.

TABLE 9

| IMR | eNB 1 | eNB 2 |
|---|---|---|
| IMR 0 | muting | Data transmission |
| IMR 1 | Data transmission | muting |
| IMR 2 | muting | muting |

As shown in Table 9, the eNB 1 performs muting and the eNB2 performs data transmission in an IMR 0. The UE measures interference received from other eNBs except the eNB 1 in the IMR 0. The eNB 2 performs muting and the eNB1 performs data transmission in an IMR 1. The UE measures interference received from other eNBs except the eNB 2 in the IMR 1. Both the eNB 1 and the eNB2 perform muting in an IMR 2. The UE measures interference received from other eNBs except the eNB1 and the eNB 2 in the IMR 2.

Hence, if data is received from the eNB1, CSI information of the CSI process 0 shows optimized RI, PMI, and CQI information. If data is received from the eNB2, CSI information of the CSI process 1 shows optimized RI, PMI, and CQI information. If data is received from the eNB 1 and no interference is received from the eNB2, CSI information of the CSI process 2 shows optimized RI, PMI, and CQI information.

Dual Connectivity

Dual connectivity of which a UE has at least two or more connections is explained. In order to explain the dual connectivity, terminologies described in the following are defined. (i) Bearer split: a bearer is divided or split by multiple eNBs; (ii) Dual connectivity: a UE is in an RRC connected state with a master eNB (MeNB) and a secondary eNB (SeNB); (iii) MeNB: an eNB corresponding to an end part of at least a part of S1-MME. The MeNB plays a role of a mobility anchor for a core network; (iv) Xn: an interface between the MeNB and the SeNB A user plane structure for dual connectivity is explained. The dual connectivity includes a master eNB and a slave eNB. Hence, as shown in FIG. 12, a user plane can be divided by three options described in the following. (i) option 1: when S1-U is ended in an SeNB; (ii) option 2: when S1-U is ended in an MeNB and there is no bearer split in RAN; (iii) option 3: when S1-U is ended in an MeNB and there is bearer split in RAN.

Figure 13:
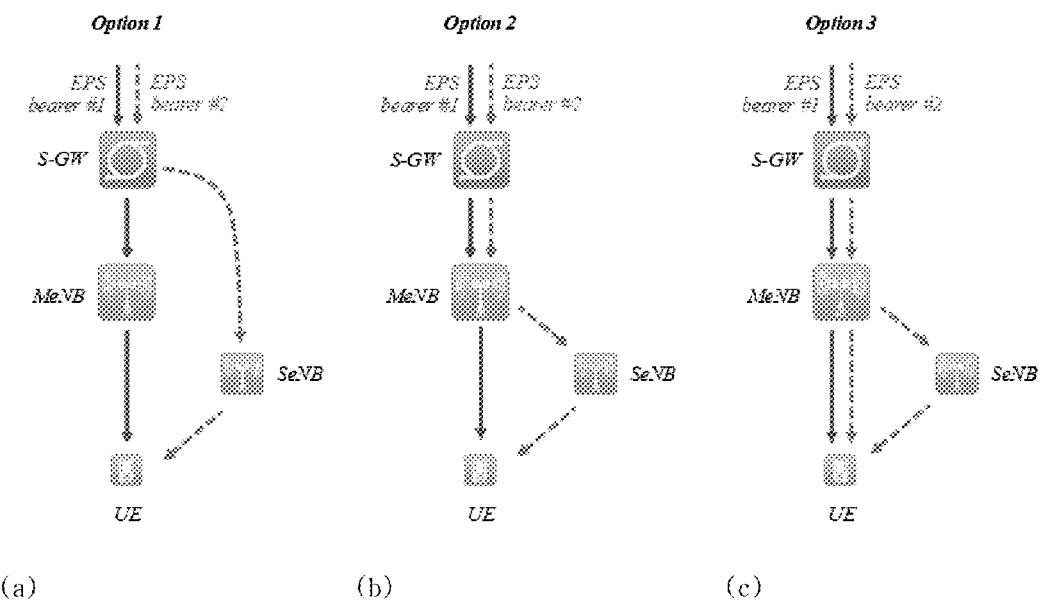
FIGS. 13 and 14 are diagrams for explaining a bearer split scheme according to one embodiment of the present invention.

FIG. 13 (a) shows an example for a case that S1-U is ended in an MeNB and independent PDCPs exist for a split bearer. FIG. 13 (b) shows an example for a case that S1-U is ended in an MeNB, a bearer is split in the MeNB and there exists an independent RLC. FIG. 13 (c) shows an example for a case that S1-U is ended in an MeNB, a bearer is split in the MeNB and there exist RLCs in relation of master-slave.

I. NIB Interface

1. CoMP Operations Over NIB Interface

Meanwhile, a CoMP technology of current LTE-A standard assumes that a backhaul link between TPs participating in CoMP transmission corresponds to an ideal backhaul (IB) of no delay. In particular, when information is exchanged between TPs, since there is no delay, it is able to determine/change/exchange dynamic scheduling between the TPs in every subframe unit. Under the assumption of the ideal backhaul link, it is able to support DPS (dynamic point selection) capable of changing a TP transmitting PDSCH in every subframe. For example, in order to support the DPS, when a DL grant is transmitted to a UE to which TM 10 is set using a DCI format 2D, 2-bit PDSCH RE mapping and quasi co-location indicator (PQI) field in DCI is configured by a specific state value. By doing so, PDSCH RE mapping information on a PDSCH transmission TP and QCL information between RSs are dynamically provided.

Yet, if a plurality of TPs are connected with each other by a non-ideal backhaul (NIB), it is difficult to apply the CoMP technology of the DSP scheme. For example, this is because, in order to schedule PDSCH transmission from a neighbour TP using a DCI 2D including a PQI field in a current subframe, there is a limit point that scheduling as much as delay (e.g., dozens of ms) of NIB should be promised between two TPs in advance.

Methods of performing CoMP transmission and reception in consideration of delay of a backhaul, i.e., NIB, between TPs are proposed according to one embodiment of the present invention. As CoMP schemes considering the NIB, a semi-static point muting (SSPM) scheme, a semi-static point selection (SSPS) scheme, and a coordinated beam-forming (CB) scheme are proposed. For example, the SSPM is configured in a manner that a specific TP (e.g., serving TP1) transmits PDSCH and a TP2 mutes a prescribed time section and a hand via Xn-signaling: The SSPS means that a TP2 semi-statically has an authority for transmitting PDSCH in a state that a UE does not perform handover from a TP1 to the TP2. The CB corresponds to a scheme that the TP2 determines PMI of UEs served by the TP2 to minimize interference of the TP2 influencing on a UE served by the TP1.

In the following embodiments, the TP1 and the TP2 are described as examples. Assume that the TP1 corresponds to a serving TP or a serving cell of a current UE and the TP2 corresponds to a neighboring TP or a neighboring cell participating in CoMP. Yet, this is just an example for clarity of explanation. The present invention may be non-limited by the example.

2. Xn-Signaling for CoMP Operations Over NIB Interface

According to one embodiment of the present invention, Xn-signaling between TPs is defined for an operation of SSPM, SSPS or CB. Meanwhile, the Xn-signaling may correspond to X2-signaling corresponding to a legacy signal exchange protocol between base stations or a protocol newly defined for the present invention.

It is preferable to exchange information required to be configured or reconfigured to a CoMP UE via RRC signaling between TPs via Xn-signaling before a CoMP operation is initiated by the Xn-signaling. This is because latency of the RRC signaling may be greater than latency (e.g., dozens of ms) of the Xn-signaling as much as dozens or hundreds of ms. It is preferable that the information is RRC set to the CoMP UE before SSPS is initiated. The information can also be used for determining whether to initiate an SSPS operation.

In the following, the information exchanged between TPs via the Xn-signaling is called Xn-signaling information. Although the Xn-signaling information is exchanged between a TP1 and a TP2 via the Xn-signaling before SSPS is initiated, the information can be exchanged again via a message indicating the initiation of the SSPS. As mentioned above, if the Xn-signaling information is included in the message indicating the initiation of the SSPS, it is able to finally check the Xn-signaling information before the SSPS is initiated.

According to a different embodiment, only information indicating initiation of SSPS (e.g., a start point of the SSPS) can be exchanged between TPs via the Xn-signaling. A TP2 can perform an SSPS operation using Xn-signaling information lastly obtained from a TP1 or Xn-signaling information lastly transmitted to the TP1.

II. SSPS

As mentioned in the foregoing description, the SSPS corresponds to a scheme that a TP (e.g., serving TP1) operating as a serving cell handovers a PDSCH transmission point to a TP2 only without making a UE handover to the TP2. For example, determination of the TP2, which has an authority for transmitting PDSCH for an SSPS time section, can be determined according to whether or not there is a room for a traffic load situation. And, a transmission point of the SSPS can be determined according to whether or not channel quality of the TP is better than channel quality of the TP1. The channel quality of the TP1 and the channel quality of the TP2 can also be determined based on CoMP feedback information on multiple CSI processes of the UE.

Meanwhile, as mentioned in the following description in detail, explicit or implicit information for determining a start point and an end point of the SSPS can be exchanged between TPs. If an SSPS section is over, PDSCH transmission authority can be automatically returned to the TP1 corresponding to the serving cell.

1. Dual Connectivity for SSPS

DL data (e.g., TCP/IP packet) of a UE, which used to be transmitted to a TP1 from a network (e.g., router), is transmitted to a TP2 (non-serving) transmitting PDSCH according to SSPS or it is necessary for the TP1 and the TP2 to share the DL data with each other. To this end, dual connectivity schemes can be applied to the TP1 and the TP2. For example, the DL data can be shared between the TP1 and the TP2 in a manner of interworking/combining bearer split and U-plane alternatives (e.g., splitting of a single EPS bearer) with each other.

1-1. Bearer Split for SSPS

In case of a general bearer split, it is able to split a bearer into bearers for data services different from each other. On the contrary, in case of SSPS, it is necessary to split a bearer into a plurality of bearers for a data service identical to each other or associated with each other. To this end, signaling is defined in a physical layer to indicate that a TP1 and a TP2 are in change of transmitting data for time sections different from each other. In this case, the signaling can be performed by an upper level for the purpose of exchanging a backhaul signal.

Each of data packets, which are separated from each other by a bearer split, is individually scheduled by a TP of its own and ACK/NACK process is also individually performed. Hence, the bearer split is appropriate for a high-capacity data service, which is not sensitive to latency.

According to one embodiment of the present invention, a TP1 and a TP2 receive an identical data packet from a bearer #1 and a bearer #2, respectively, in parallel. The TPs exchange information on a TP in charge of transmitting PDSCH for SSPS and information on a data packet of which transmission or ACK reception is completed with each other. Subsequently, a TP, which has received authority for transmitting PDSCH for SSPS, continues to perform transmission from a packet right after a packet of which another TP has completed transmission or ACK reception. Among data packets provided by a bearer, a packet of which another TP has already completed transmission or ACK reception is discarded.

According to another embodiment of the present invention, a TP1 (e.g., serving cell) can be configured as a master of data packet management. If the TP1 hands over SSPS transmission authority to a TP2, the TP 2 can indicate a size of data of which transmission and/or ACK is received in a data packet unit. On the contrary, if the TP1 hands over the SSPS authority to the TP2, the TP2 can indicate a start point of data of which transmission and/or ACK is received. Or, if the TP1 sets an SSPS time section to the TP2, the TP2 can make a feedback on information on the data of which transmission and/or ACK is received in a data packet unit to the TP1 during the set SSPS time section (Xn-signaling).

Meanwhile, an optimized TP(s) of a UE may change according to mobility of the UE in the aspect of signal quality. In this case, a transmitting TP may independently change according to each bearer. In other word, in order to deliver a data packet, which is used to be delivered to a TP2 via a specific bearer, to a TP3, Xn-signaling is performed on the TP2 and/or the TP3. For example, the TP1 asks the TP3 to receive a data packet via a specific bearer. The TP3 transmits a response for accepting or rejecting the request of the TP1 to the TP1. If there is a negotiation between the TP1 and the TP3 in advance, it may be promised that the TP3 should follow the request of the TP1. As mentioned above, the TP3 can obtain PDSCH transmission authority for SSPS via 1-way Xn-signaling of the TP1. CSI-RS configuration, CSI-IM configuration, CSI process configuration, DMRS configuration and the like set to the TP3 can be exchanged between the TP1 and the TP3 in advance via Xn-signaling. The TP1 can reconfigure RRC to a UE before the SSPS is initiated.

1-2. U-Plane Alternatives for SSPS

Figure 14:
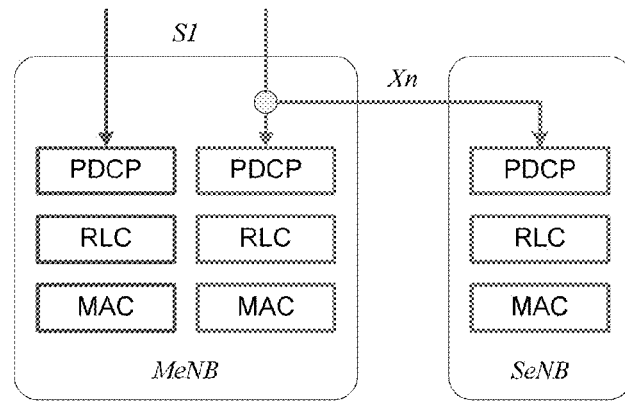
Figure 14:
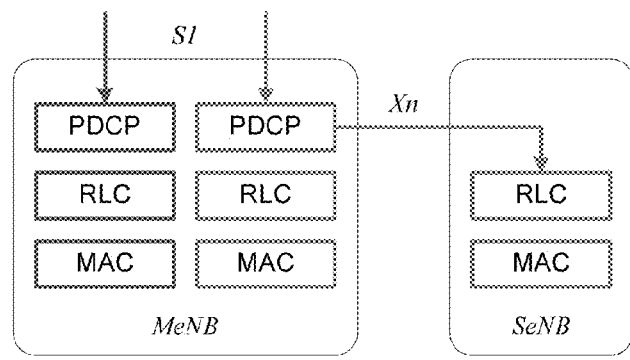
Figure 14:
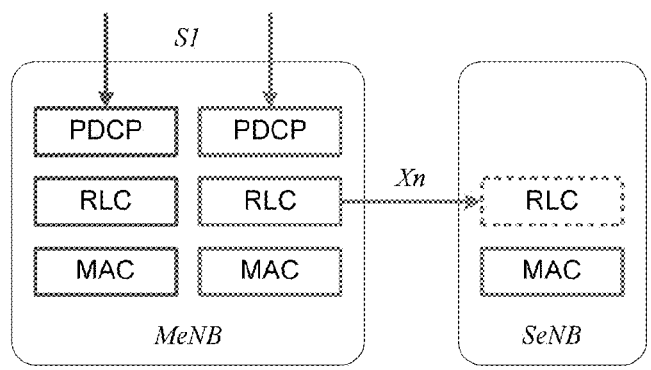

According to U-plane alternatives (e.g., splitting of a single EPS bearer), a data packet provided by a single bearer is shared among multiple TPs performing SSPS. For example, schemes shown in FIG. 14 (*a*) to (*c*) can be used. As shown in FIG. 14 (*a*), a PDCP can be separated from each other between TPs. As shown in FIG. 14 (*b*), an independent RLC can be provided according to a TP in an RLC level. As shown in FIG. 14 (*c*), it may have a form of master-slave RLCs.

A TP1 (e.g., serving cell) transmits a data packet of PDCP or RLC layer to a TP2 transmitting PDSCH according to SSPS. In this case, the TP1 can directly transmit a data packet via Xn-signaling. The TP1 can transmit Xn-signaling information required for an SSPS operation to the TP2 before the data packet or together with the data packet. A scheme for the TP1 to directly transmit a data packet to the TP2 via Xn-signaling is appropriate for a data packet, which is relatively less sensitive to latency. Although latency occurs in transmitting a data packet due to delay of Xn-signaling, the TP2, which has a room for traffic load, is in charge of radio transmission to a UE in consideration of loading situation and the like.

According to a different embodiment of the present invention, the TP1 and the TP2 can respectively receive an identical data packet from a single bearer in parallel. Subsequently, the TPs exchange information on a TP in charge of transmitting PDSCH for SSPS and information on a data packet of which transmission or ACK reception is completed with each other via Xn-signaling. The TP2, which has acquired authority for transmitting PDSCH for SSPS, discards data packets of which transmission and ACK reception are completed by the TP1 among data packets received from the bearer. The TP2 initiates transmission from a next data packet. A data packet, which is initiated by the TP2, can be indicated via an index.

According to a further different embodiment of the present invention, if a TP1 (e.g., serving cell) is configured as a master of data packet management and the TP1 hands over PDSCH transmission authority to a TP2, the TP1 can signal a size of a specific data packet, which is to be transmitted and ACK received by the TP2. The TP1 sets an SSPS time section to the TP2 and the TP2 can report that all data packets indicated by the TP1 are transmitted and ACK reception is completed during the SSPS time section to the TP1. If the TP2 does not transmit all of the data packets indicated by the TP1 or receive the ACK during the SSPS time section, the TP2 reports a buffer status report indicating data packets of which transmission and ACK reception are completed to the TP1 via Xn-signaling.

According to a further different embodiment of the present invention, the TP1 indicates the TP2 to transmit data packets as many as possible during the SSPS time section and the TP2 can report information on transmitted and ACK received data until the timing on which the SSPS time section is expired to the TP1 in a data packet unit.

Although data sharing shared by the aforementioned bearer split and the U-plane alternatives is explained centering on the SSPS scheme, the data sharing can be applied to different CoMP operations as well.

2. SSPS Initiation

SSPS can be initiated by a TP1 or a TP2 and can be classified into 1-way and 2-way.

2-1. TP2 Initiated SSPS

SSPS can be initiated by a TP2. For example, first of all, the TP2 can transmit SSPS initiation information including information on a loading room of the TP2 to a TP1 via Xn-signaling of broadcast/multicast/unicast scheme. The information on the loading room of the TP2 may indicate a specific time section and a specific band on which a loading room exists.

The SSPS initiation information may correspond to a message for requesting a response to a TP(s), which is going to hand over a PDSCH transmission authority to a UE.

The TP1, which wants to perform the SSPS, confirms the received SSPS initiation information as it is or selects a specific time section of the SSPS initiation information, selects an SSPS time section and an SSPS hand preferred by the TP1 on a specific band and may be then able to transmit the selected time section and the band to the TP2 (2-way Xn-signaling).

Meanwhile, the SPS time section may correspond to such a value of an actual specific time unit as a subframe and the like. The SPS time section may indicate when the SSPS is initiated and terminated. For example, the SSPS time section can be represented by an offset from prescribed reference time which is promised between the TP1 and the TP2 in advance.

And, the SSPS time section can be represented by a set of non-contiguous time sections rather than contiguous time sections. For example, contiguous or non-contiguous time sections can be represented by a subframe bitmap. It is able to additionally signal information indicating a point (e.g., specific subframe index and the like) on which the SSPS time section is initiated on the subframe bitmap. It is able to signal information indicating a point (e.g., specific subframe index and the like) on which the subframe bitmap is terminated after that subframe bitmap is circularly repeated for cycles.

An SSPS band can be represented by such a frequency resource unit as an RB unit and the like. The SSPS band can be contiguous or non-contiguous with each other. The SSPS band can be assigned over a plurality of component carriers.

2-2. TP1 Initiated SSPS

A TP1 eager to initiate SSPS can make a request for SSPS initiation to a TP2 via Xn-signaling. A message for requesting the SSPS initiation can include information on an SSPS time section and an SSPS band. The TP2 can transmit a response for accepting/rejecting the SSPS initiation request of the TP1 (2-way Xn-signaling).

The SSPS initiation request can be triggered according to a prescribed event. The prescribed event may be based on loading or channel quality. In case of the channel quality, the TP1 sets at least two or more CSI processes to UEs served by the TP1. For example, a first CSI process is configured by a combination of a first NZP CSI-RS and a first CSI-IM and a second CSI process is configured by a combination of a second NZP CSI-RS and a second CSI-IM. The TP1 receives a first CQI and a second CQI corresponding to feedback according to the first and the second CSI process. If a difference between the first CQI and the second CQI is equal to or greater than a predetermined threshold, the TP1 transmits the SSPS initiation request.

According to a different embodiment of the present invention, the TP2 can be configured to mandatorily accept the SSPS initiation request of the TP1 (1-way Xn-signaling). According to a further different embodiment of the present invention, the TP2 can accept or reject the SSPS initiation request depending on loading or a channel status. For example, if the TP2 has a room of loading equal to or greater than a threshold, the TP2 should accept the SSPS initiation request of the TP1. If the TP2 does not have a room equal to or greater than the threshold, the TP2 can reject the SSPS initiation request of the TP1.

Meanwhile, it is able to configure priority between TPs in advance. For example, when a TP1 corresponds to a master and a TP2 corresponds to a slave, 1-way signaling can be defined in a manner that the TP1 sends an SSPS initiation request to the TP2 and the TP2 mandatorily accepts the SSPS initiation request.

In particular, if it is able to check that a specific TP2 is able to perform SSPS in advance via the exchange of the aforementioned first Xn-signaling information, Xn-signaling indicating the initiation of the SSPS may correspond to an indication (command) transmitted from the TP1 to the TP2 in 1-way.

3. SSPS Update/Termination

After SSPS is initiated via Xn-signaling such as 1-way or 2-way, an SSPS time section can be modified or updated. For example, the SSPS time section can be extended or reduced via additional Xn-signaling such as 1-way or 2-way before the SSPS time section is expired. And, an SSPS band can also be modified via additional Xn-signaling.

It is able to define as the SSPS is automatically terminated when the SSPS time section is expired. According to a different embodiment of the present invention, there may exist explicit Xn-signaling for the termination of the SSPS.

Meanwhile, the TP2 can report information on a resource use rate of the SSPS time section and the SSPS band to the TP1 via Xn-signaling in the middle of the SSPS time section or after the SSPS is terminated. For example, the TP2 can make a feedback on a frequency of scheduling the SSPS time section and the SSPS band for PDSCH or a ratio of occupying the SSPS time section and the SSPS band for PDSCH to the TP1. If the extent of utilizing the SSPS time section and the SSPS band for scheduling of a CoMP UE is fed back, the TP1 can reduce resource waste or resource shortage in the SSPS time section and the SSPS band when the TP1 operates SSPS in the future.

III. Xn-Signaling Information for SSPS

Figure 15:
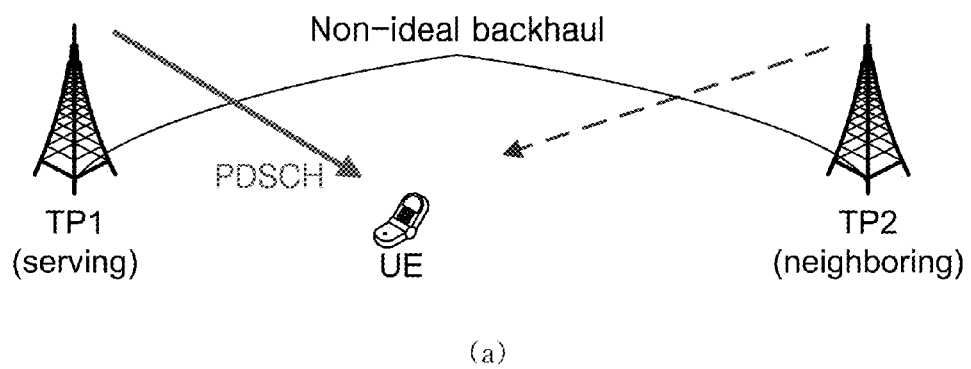
FIG. 15 is a diagram for explaining an SSPS scheme according to one embodiment of the present invention.
Figure 15:
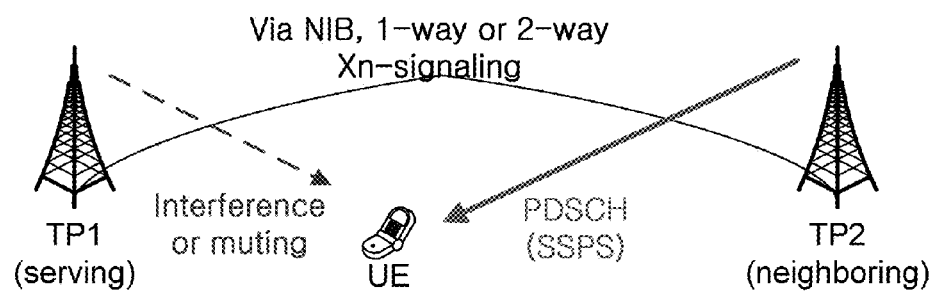

FIG. 15 (a) shows a case that a CoMP operation is not activated. Hence, a UE receives both a DL grant and PDSCH from a TP1 corresponding to a serving cell. For an SSPS operation shown in FIG. 15 (b), a TP1 and a TP2 exchange Xn-signaling information with each other in advance before the SSPS operation is performed in non-CoMP situation.

The Xn-signaling information can be exchanged between the TPs periodically or according to a specific event. The TPs exchange the Xn-signaling information with each other via Xn-signaling having delay (e.g., dozens of ms) and can determine time and a condition (e.g., if there is a room for loading situation of a specific TP, muting is performed) of initiating a CoMP operation.

Meanwhile, the TP1 (or TP2) can make a request for the Xn-signaling information to the TP2 (or TP1) via the Xn-signaling. According to a different embodiment of the present invention, the Xn-signaling information can be multicast to a plurality of TPs or broadcasted to random TPs instead of being unicast Xn signaled.

The Xn-signaling information includes at least one of information described in the following.

1. Loading Information

The TP2 (or TP1) can perform Xn-signaling on such loading information as the number of UEs served by the TP2, a ratio of the maximum number of UEs capable of being served by the TP2 to the number of UEs currently served by the TP2, a ratio of the maximum number of UEs capable of being served by the TP2 to the number of UEs capable of being served by the TPs in the future and the like for the TP1 (or TP2).

2. CSI-RS(s) Configuration Information

The TP2 (or TP1) can perform Xn-signaling on at least one of configuration information of an NZP CSI-RS used by the TP2 and ZP CSI-RS configuration information (e.g., ZP CSI-RS RE position, period, offset, etc.) applied to PDSCH rate matching for the TP1 (or TP2).

3. CSI-IM(s) (IMR) Configuration Information

In order for the TP1 (or TP2) to control CSI-IM configuration information set to UE(s) served by the TP1 and inter-cell interference, the TP1 (or TP2) can perform Xn-signaling on at least one of CSI-IM configuration information (e.g., ZP CSI-RS RE position, period, offset, etc.) set to a UE(s) of neighboring TPs known to the TP1 (or TP2) and information on whether the TP1 performs muting or transmission in a corresponding RE in every CSI-IM configuration for the TP2 (or TP1).

4. Periodic CSI (P-CSI) Feedback (FB) Configuration Information

The TP1 can perform Xn-signaling on at least a part of periodic CSI (P-CSI) feedback (FB) configuration information set to a UE by the TP1 for the TP2. By doing so, the TP2 can obtain P-CSI FB information transmitted by the UE.

The TP1 can set a plurality of P-CSI FB configurations to a UE. In this case, the TP1 can perform Xn-signaling on a P-CSI FB configuration providing information necessary for transmitting PDSCH of the TP2 only for the TP2.

The P-CSI FB configuration providing information necessary for transmitting PDSCH can be determined as follows. The TP1 can set a plurality of CSI processes to a UE according to a TM10 (e.g., CSI-ProcessToAddModList-r11 included in CQI-ReportConfig Information element). A configuration of a single NZP CSI-RS is associated with each of a plurality of the CSI processes. If a configuration of a first NZP CSI-RS, which is to be transmitted to a UE by the TP2, is associated with a first CSI process set to the UE, it is determined as the first CSI process provides information necessary for transmitting PDSCH of the TP2. Hence, the TP1 can inform the TP2 of a configuration for a CSI (e.g., RI, PMI, CQI, etc.) reporting format according to the first CSI process. For example, all or at least a part of current P-CSI FB configurations (information on a format of PUCCH on which CSI is transmitted (e.g., PUCCH format 2), CSI reporting mode information (e.g., Mode 1-0, 2-0, 2-1) indicating a CQI feedback type (wideband/subband CQI) and a PMI feedback type (no PMI/single PMI), a parameter (e.g., $N_{pd}$) for a subframe interval between CSI report instances, transmission interval parameter (e.g., $M_{RI}$) of an RI, J value, K value and the like) can be transmitted to the TP2.

If the P-CSI FB configuration(s) information is delivered to the TP2 via Xn-signaling, the TP2 directly receives P-CSI FB reports of a UE based on the P-CSI FB configuration(s) for a section in which SSPS authority is handed over to the TP2. The TP2 determine MCS, a precoder, a rank, RB assignment and the like using the P-CSI FB report when PDSCH is scheduled for SSPS.

5. UL-CoMP PUCCH Configuration Information

The TP1 can perform X2 signaling on information on PUCCH configuration for the TP2 to enable the TP2 to obtain PUCCH transmitted by a UE. For example, when the UE transmits CSI FB information via a PUCCH format 2, it is necessary to decode the PUCCH format 2 to enable the TP2 to obtain CSI FB.

The TP1 can set a PUCCH virtual cell ID (virtual cell-ID (VCI)_PUCCH, e.g., $n_{ID}^{PUCCH}$) to a UE as a PUCCH sequence scrambling initialization parameter. A range of the VCI_PUCCH corresponds to a range ranging from 0 to 503. The range is matched with a range (0 to 503) of a physical cell-ID (PCI). If the VCI_PUCCH is configured via RRC, the UE performs scrambling initialization using the VCI_PUCCH instead of the PCI when PUCCH is transmitted in the future and generates a PUCCH sequence.

Since the VCI_PUCCH is used, PUCCH of the UE and PUCCHs transmitted by UEs of neighboring cells participating in CoMP transmission rather than a serving cell can be multiplexed together based on cyclic shift (CS) orthogonality. Hence, a reception point (RP) of the PUCCH of the UE can be semi-statically switched from the TP1 to the TP2.

Meanwhile, the TP1 can set a plurality of VCI_PUCCHs to the UE. For example, the TP1 can configure a VCI_PUCCH used for generating a PUCCH sequence among a VCI_PUCCH1 and a VCI_PUCCH2 according to each P-CSI FB configuration.

If a specific P-CSI FB configuration(s) is delivered to the TP2 only via Xn-signaling among P-CSI FB configurations, the TP2 can obtain P-CSI FB reports via a VCI_PUCCH associated with the specific P-CSI FB configuration(s).

For example, assume that a VCI_PUCCH1 is set to a P-CSI FB configuration 1 and a VCI_PUCCH2 is set to a P-CSI FB configuration 2. The TP1 performs Xn-signaling on the VCI_PUCCH2 for the TP2. If an SSPS operation is initiated, the TP2 decodes PUCCH using the VCI_PUCCH2 and may be able to obtain a CSI report based on the P-CSI FB configuration 2.

6. Aperiodic CSI (A-CSI) Feedback (FB) Configuration Information

As mentioned in the foregoing description, if PDSCH transmission authority is handed over to the TP2 for SSPS, the TP2 receives P-CSI FB reports from a UE and may be able to perform scheduling based on the P-CSI FB reports. Meanwhile, the TP2 may directly trigger A-CSI transmission. The TP2 can frequently receive FB reports via aperiodic CSI FB and can perform more subtle frequency selective scheduling.

The TP1 can perform Xn-signaling on A-CSI FB configuration(s), which is set to a UE via RRC, for the TP2 as it is. If a plurality of A-CSI FB configurations are set to the UE, A-CSI FB configuration(s) associated with PDSCH transmission of the TP2 can be delivered to the TP2 only.

A method of determining the A-CSI FB configuration(s) associated with the PDSCH transmission of the TP2 is described in the following.

For example, if a first NZP CSI-RS configuration transmitted by the TP2 is associated with a first CSI process, it is determined as a first A-CSI FB configuration, which is configured to report the first CSI process, is associated with the PDSCH transmission of the TP2.

According to a different embodiment, there may exist a second VCI_PUCCH associated with a second CSI process of a second A-CSI FB configuration. The TP1 can deliver the second A-CSI FB configuration to the TP2 according to whether a value of the second VCI_PUCCH corresponds to a value associated with the TP1 or a value associated with the TP2. Meanwhile, the TP1 can set information on whether the value of the second VCI_PUCCH corresponds to the value associated with the TP1 or the value associated with the TP2 to a UE via RRC.

According to a further different embodiment, it may be able to configure a third VCI_PUCCH, to a third A-CSI FB configuration. If a value of the third VCI_PUCCH corresponds to a value associated with the TP2, the TP1 delivers the third A-CSI FB configuration to the TP2.

For example, A-CSI FB configuration, which is Xn-signaled to the TP2 by the TP1, can include information (e.g., A-CSI FB mode (e.g., mode 3-1 and the like)) on a format of a CSI (e.g., RI, PMI, CQI).

The TP2 directly receives A-CSI FB reports of the UE based on the A-CSI FB configuration(s) during an SSPS time section. The TP2 determines MCS, a precoder, a rank, RB assignment and the like for PDSCH transmission via the A-CSI FB reports of the UE. The TP2 can perform A-CSI triggering via EPDCCH. Regarding this, it shall be explained later in more detail.

According to a further different embodiment, A-CSI FB configuration(s) transmitted to the TP2 by the TP1 can be provided based on a CSI request field and description shown in Table 10 in the following.

TABLE 10

| Value of CSI request field | Description |
| --- | --- |
| '00' | No aperiodic CSI report is triggered |
| '01' | Aperiodic CSI report is triggered for a set of CSI process(es) configured by higher layers for serving cell $^c$ |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

For example, the TP1 can provide the TP2 with a CSI request field '10' and information on '$1^{st}$ set of CSI process(es)' corresponding to 'Aperiodic CSI report is triggered for a $1^{st}$ set of CSI process(es) configured by higher layers' only. An NZP CSI-RS transmitted by the TP2 can be indicated by a specific CSI process among the '$1^{st}$ set of CSI process(es)'. If A-CSI FB configuration(s) information associated with the TP2 is provided to the TP2 only, the TP2 can indicate '10' only when the TP2 transmits A-CSI triggering to a UE.

According to a further different embodiment, the TP2 can be restricted to use a specific EPDCCH set (e.g., set 1) only. In this case, the TP2 definitely configures a CSI request field of the specific EPDCCH set by 10. If the CSI request field of the specific EPDCCH set is not 10, it is able to configure a UE to ignore the CSI request triggering. In particular, if the TP2 performs A-CSI triggering via a CSI request field(s) not provided by the TP1, the A-CSI triggering is processed as an error case.

7. UL-COMP PUSCH DMRS Configuration Information

A UE can transmit A-CSI FB reports on PUSCH. Hence, in order for the TP2 to receive the A-CSI FB reports, it is necessary to have PUSCH DMRS configuration information. For example, the TP1 delivers a DMRS sequence scrambling initialization parameter to the TP2 via Xn-signaling. Subsequently, the TP2 can coherently decode PUSCH and a DMRS using the DMRS sequence scrambling initialization parameter.

Meanwhile, the TP1 can set a virtual cell ID (VCI_PUSCH, e.g., n ID$^{PUSCH}$) for PUSCH and a virtual cell ID (VCI_CSH) for a cyclic shift hopping (CSH) pattern to a UE via RRC. A range of the VCI_PUSCH and a range of the VCI_CSH may respectively correspond to (0 to 509). If the UE receives an RRC parameter set {VCI_PUSCH, VCI_CSH} via RRC, the UE can transmit PUSCH using the VCI_PUSCH and the VCI_CSH instead of a PCI of the TP1.

Since the UE uses the VCI_PUSCH, the PUSCH of the UE and PUSCHs, which are transmitted by neighboring UEs participating in CoMP transmission rather than a serving cell, can be multiplexed together based on cyclic shift (CS) orthogonality. Hence, a reception point (RP) of the PUSCH of the UE can be semi-statically switched from the TP1 to the TP2. Since the TP2 performs A-CSI triggering using RRC configuration, which is set to the UE by the TP1, as it is, it is not necessary for the TP2 to separately set RRC to the UE.

Meanwhile, the TP1 can set a plurality of VCI_PUSCH and VCI_CSH sets to the UE. For example, a first VCI set (VCI_PUSCH1 and VCI_CSH1) and a second VCI set (VCI_PUSCH2 and VCI_CSH2) can be set to the UE. In this case, the first VCI set can be configured to be used by the TP1 and the second VCI set can be configured to be used by the TP2. In this case, the TP1 can transmit information on the second VCI set to the TP2.

Meanwhile, DL and UL can be separated from each other to make the TP1 receive uplink data and make the TP2 transmit downlink data in an SSPS operation. The UE receives a UL grant from the TP1 to transmit the uplink data. The UE generates and transmits PUSCH including the uplink data via the first VCI set. If the TP2 performs A-CSI triggering, the UE generates and transmits PUSCH including a corresponding A-CSI report using the second VCI set.

According to one embodiment, the TP2 can obtain both transmission authority of DL and reception authority of UL. On the contrary, the TPS can obtain the reception authority of UL only without the transmission authority of DL. In the aforementioned cases, the second VCI set can also be used for generating and transmitting PUSCH including general uplink data.

8. DL DMRS Configuration Information for PDSCH

It is necessary to support Xn-signaling to exchange DL DMRS configuration (e.g., DMRS sequence scrambling initialization parameter) information between TPs in advance when each TP transmits PDSCH according to a UE for CoMP transmission. DMRS configuration, which is necessary for generating a DMRS sequence or mapping a generated sequence to a resource, corresponds to a UE-specific value.

In particular, in case of an SSPS scheme, a TP1 hands over PDSCH transmission authority to a TP2 via Xn-signaling for SSPS. In this case, if the TP2, which has received the PDSCH transmission authority, sets a DMRS to a UE via RRC signaling, there may exist a problem that latency of PDSCH transmission becomes large. This is because latency of the RRC signaling may be greater than latency of the Xn-signaling. Hence, the TP2 transmits DMRS configuration information for the UE to the TP1 via X2 signaling before the SSPS is initiated and the TP1 sets DMRS configuration of the TP2 to the UE via RRC signaling before the SSPS is initiated.

DL DMRS sequence scrambling initialization parameters, which are used for generating a DL DMRS by the TP1 and the TP2, can be set to the UE (n ID$^{DMRS}$). For example, the TP1 can set a VCI_DMRS(0) and a VCI_DMRS(1) having a range ranging from 0 to 503 to the UE. To this end, the TP1 and the TP2 can exchange information DMRS(0) on the VCI_DMRS(0) and the VCI_DMRS(1) with each other before an SSPS operation is performed. The DMRS configuration information can be included again in the Xn-signaling indicating initiation of the SSPS. This may be performed for the purpose of checking the DMRS configuration information. The TP1 can indicate the TP2 to use one of the VCI_DMRS(0) and the VCI_DMRS(1). The TP1 can transmit at least one information selected from the group consisting of indication (e.g., $n_{SCID}=1$) of a scrambling identity field ($n_{SCID}$) for generating a DMRS scrambling initialization sequence, $n_{SCID}$ used by the TP2, an antenna port, and a rank(s) to the TP2.

A control channel capable of transmitting a DL grant of the TP2 is restricted to an EPDCCH set (e.g., set 1) as shown in Table 11 in the following and is restricted to a specific DL-related DCI(s) masked with C-RNTI. The TP1 transmits information on the restriction of the DL grant transmission of the TP2 to the UE via RRC signalling.

The TP1 can configure the UE via RRC to decode PDSCH, which is transmitted according to the DL grant of the TP2, via a specific VCI_DMRS (e.g., VCI_DMRS(1)). For example, if the TP2 transmits a DL grant, the UE always generates a DMRS sequence on the basis of the VCI_DMRS (1). An $n_{SCID}$ value for generating the DMRS sequence may be independent from VCI_DMRS. The TP1 can configure the UE to always use the VCI_DMRS(1) via RRC signalling no matter what the $n_{SCID}$ value is set to 0 or 1. On the contrary, it is able to configure the $n_{SCID}$ value (e.g., $n_{SCID}=0$) for the VCI_DMRS(1) (e.g., $n_{SCID}=1$).

9. CSI Process Configuration Information

P/A-CCSI FB configuration includes CSI process index(es). The TP1 can transmit CSI process configuration information corresponding to the CSI process index(es) included in the P/A-CCSI FB configuration to the TP2. A plurality of CSI processes can be included in a set of CSI process(es) included in A-CSI FB configuration(s), which are transmitted to the TP1 by the TP2. For example, the set of CSI process(es) includes not only a first CSI process indicating an NZP CSI-RS index transmitted by the TP2 but also a second CSI process.

If the TP2 performs A-CSI triggering via a CSI request field, A-CSI FB reports according to the first CSI process and the second CSI process, which are included in the set of CSI process(es), are multiplexed by the UE and are transmitted to PUSCH. The TP2 can decode contents of an A-CSI FB report corresponding to the first CSI process only when the TP2 clearly knows a size and a transmission order of contents of FB reports according to each of the multiplexed CSI processes. Hence, it is necessary for the TP1 to provide second CSI process configuration to the TP2 as well.

The CSI process configuration information can include at least one of an NZP CSI-RS index, a CSI-IM index, and a parameter Pc (ratio of PDSCH EPRE to CSI-RS EPRE).

Meanwhile, the TP1 can notify the UE that the TP2 will trigger an A-CSI using a specific EPDCCH set or a specific DCI format only. If the UE receives A-CSI triggering from the TP2, A-CSI FB contents on a CSI process, which is related to an NZP CSI-RS of the TP2, are multiplexed only with PUSCH according to a predetermined order and can be transmitted (RRC configuration configured by the TP1).

It is able to newly define a table indicating description of a CSI request field for A-CSI triggering of the TP2. For example, the description of Table 10 can be redefined for the TP2. Additional description for at least one state selected from the group consisting of '01', '10' and '11' is set to the UE via RRC. The TP1 notifies the UT that the additional description is applied when the A-CSI triggering of the TP2 is received. For example, assume that additional description is configured for the '10' state, the first CSI process (e.g., corresponding to the TP1) and the second CSI process (e.g., corresponding to the TP2) are included in the set of process(es) in original description, and the second CSI process is included in the set of CSI process(es) only in the additional description. If A-CSI triggering is received from the TP2, the UE performs the second CSI process only according to the additional description and may be then able to transmit a CSI report to PUSCH. If A-CSI triggering is received from the TP1, the UE performs both the first and the second CSI process according to the original description and may be then able to transmit each CSI report to PUSCH.

Meanwhile, the TP1 can set the additional description to the UE in a manner of RRC signaling an indicator indicating the second CSI process among the first CSI process and the second CSI process according to the original description.

10. EPDCCH Set Configuration Information

A method for the TP2 to transmit a DL grant or A-CSI triggering to the UE is proposed. According to one embodiment of the present invention, the TP2 can transmit a DL grant or A-CSI triggering to a legacy PDCCH region using a specific DCI format. In order to make the UE perform blind decoding (BD) on a search space where legacy PDCCH of the TP2 may exist, it is necessary for the TP1 to signal information necessary for performing the blind decoding to the UE via RRC. By doing so, the TP2 can use the legacy PDCCH region.

According to a different embodiment of the present invention, the TP1 configures a plurality of EPDCCH sets, e.g., an EPDCCH set 0 and an EPDCCH set 1, to the UE. In this case, the EPDCCH set 0 is configured as a search space in which a DCI of the TP1 is transmittable and the EPDCCH set 1 is configured as a search space in which a DCI of the TP2 is transmittable only or DCIs of the TP1 and the TP2 are transmittable via RRC. The TP1 transmits information on configuration of the EPDCCH set to the TP2 via Xn-signaling. The TP2 transmits a DL grant or A-CSI triggering by itself via the EPDCCH set 1.

Table 11 shows an embodiment of configuring an EPDCCH set.

TABLE 11

| | Main entity of transmission | | |
| --- | --- | --- | --- |
| | TP1 (serving-cell) | | TP2 (neighboring-cell) |
| | Channel on which DCI is transmitted | | |
| | Legacy PDCCH | EPDCCH set 0 | EPDCCH set 1 |
| transmittable DCI format (optional) | all DCI formats except DL-related DCI masked with (SPS) C-RNTI (e.g., DCI masked with SI-RNTI, P-RNTI, RA-RNTI can be | all DCI formats except DL-related DCI masked with (SPS) C-RNTI (e.g., DCI masked with SI-RNTI, P-RNTI, RA-RNTI can be | DL-related DCI masked with (SPS) C-RNTI can be transmitted by TP2 only. (The DCI may correspond to a new format) UL-related DCI can be transmitted by TP2 using a new format |

TABLE 11-continued

| | Main entity of transmission | | |
| --- | --- | --- | --- |
| | TP1 (serving-cell) | | TP2 (neighboring-cell) |
| | Channel on which DCI is transmitted | | |
| | Legacy PDCCH | EPDCCH set 0 | EPDCCH set 1 |
| Restriction on UL-related DCI (optional) | transmitted by TP1 only) none | transmitted by TP1 only) none | only (and/or TP2 can transmit either DCI 0 or 4) CSI-only-triggering $^a$]DCI is transmittable only. (Yet, a separate DCI of a different usage such as NAICS and the like can be additionally transmitted) |
| PUSCH DMRS VCI | {VCI_PUSCH1, VCI_CSH1} | {VCI_PUSCH1, VCI_CSH1} | {VCI_PUSCH2, VCI_CSH2} |

Referring to Table 11, the TP2 can transmit a DL grant using an EPDCCH set 1. The TP2 can transmit DCI of A-CSI-only-triggering only as a UL-related DCI. If the UL-related DCI except A-CSI-triggering is received via the EPDCCH set 1, the UE considers the UL-related DCI as an error case and can be configured to ignore the UL-related DCI. The TP1 can transmit DCIs of various forms via a legacy PDCCH region and an EPDCCH set 0.

When the UE transmits A-CSI FB reports triggered by the TP2 on PUSCH, it is able to configure the UE to generate and transmit PUSCH via a VCI (e.g., {VCI_PUSCH2, VCI_CSH2}). It is able to configure the UE to generate and transmit a PUSCH DMRS sequence using {VCI_PUSCH1, VCI_CSH1} for a UL grant received from the TP1.

When only the TP2 is able to perform transmission using the EPDCCH set 1, it is able to configure the number of EPDCCH candidates according to the EPDCCH set 1 to be less than the number of EPDCCH candidates according to the EPDCCH set 0. In particular, the total number of EPDCCH candidates (e.g., if the total number of performing EPDCCH blind decoding is restricted to 44 times) is assigned to the EPDCCH set 0 and the EPDCCH set 1 in a manner of being differently divided. It is able to configure the number of aggregation level capable of being used for the EPDCCH set 1 to be smaller than the number of aggregation level capable of being used for the EPDCCH set 0. For example, an aggregation level capable of being used for the EPDCCH set 1 can be configured by 4 and/or 8. In doing so, it is able to perform EPDCCH candidate partitioning (e.g., 40 EPDCCH candidates in the EPDCCH set 0, 4 EPDCCH candidates in the EPDCCH set 1).

It is able to configure the EPDCCH set 1 to be transmitted via a first subframe set only. It is able to configure the EPDCCH set 0 to be transmitted via the first subframe set or all subframe sets.

RRC configurations necessary for the UE to decode EPDCCH can be set to the EPDCCH set 0 and the EPDCCH set 1, respectively. For example, a first PDSCH RE mapping and quasi co-location (QCL) indicator (PQI) field value (e.g., PQI index 0) for the EPDCCH set 0 and a second PQI field value (e.g., PQI index 1) for the EPDCCH set 1 are configured in a manner of being different from each other. Information related to EPDCCH transmission of the TP1 is set to the PQI index 0. For example, QCL information is configured by an NZP CSI-RS index transmitted by the TP1 and PDSCH RE mapping information is configured in accordance with transmission of the TP1. Information related to EPDCCH transmission of the TP2 is set to the PQI index 1.

11. C-RNTI Value of UE

The TP1 transmits a C-RNTI value of the UE to the TP2 to make the TP2 schedule DL/UL of the UE and transmit PDSCH to the UE. Various RNTI(s) can be exchanged via Xn-signaling.

12. PDSCH RE Mapping and Quasi Co-Location Indicator (PQI) Field Configuration Information The TP1 can transmit information on at least one or more sets among parameter sets set to the UE via RRC to the TP2 in response to each of PQI field values shown in Table 6. For example, a parameter set can include parameters such as QCLed NZP CSI-RS index, # of CRS ports for CRS rate matching (RM), CRS v-shift for CRS RM, MBSF SF configuration for CRS RM, PDSCH starting position, ZP CSI-RS index and the like.

The TP1 can transmit a specific PQI field value related to PDSCH transmission of the TP2 and a specific parameter set corresponding to a specific PQI field only to the TP2 instead of 4 parameter sets corresponding to 4 PQI field values.

For example, the specific PQI field value related to the PDSCH transmission of the TP2 and the corresponding specific parameter set can be determined by a parameter set of an index of an NZP CSI-RS transmitted by the TP2. If the TP1 omits transmission of parameter sets not used by the TP2 and parameter sets capable of being used by the TP2 are fixed, a DL-related DCI transmitted by the TP2 can be defined by a new format. This is because, if the TP2 is able to use a single PQI field value only, a PQI field is not necessary for a DCI. Although a DCI format transmitted by the TP2 does not include a PQI field, the TP1 can notify the UE via RRC that the DCI format implicitly indicates a specific PQI field value. It is able to configure as a specific PQI field value (e.g., PQI state '10') is always applied to a specific EPDCCH set (e.g., EPDCCH set 1) in which the TP2 is able to transmit a DCI.

And, it is able to configure the UE to ignore a PDSCH starting position parameter among a set of parameters corresponding to a specific PQI field value, which is explicitly/implicitly indicated by a DCI (e.g., EPDCCH set 1 and/or a specific (new) DCI format) of the TP2. Instead, it is able to configure the UE to directly decode PCFICH information transmitted by the TP2 and follow PDSCH starting position information indicated by PCFICH. When an SSPS operation is performed, since a main entity of transmitting PDSCH corresponds to the TP2, a dynamic PDSCH starting position change of the TP2 should be applied to the UE. To this end, it is necessary for the UE to have capability of decoding a legacy PDCCH region of the TP2.

13. UL Power Control

The UE can transmit PUCCH, PUSCH and/or an SRS (sounding reference signal) to the TP2. To enable the TP2 to perform UL power control (PC) of the PUCCH, the PUSCH and/or the SRS (sounding reference signal) of the UE, the TP1 transmits PC-related information to the TP2.

For example, the TP1 and the TP2 can exchange the PC-related information with each other when the TP1 indicates the TP2 to initiate SSPS via Xn-signaling. The TP1 can also exchange the PC-related information with the TP2 before the SSPS is initiated. Hence, it is able to make power control of UL transmission of the UE to be controlled with a level appropriate for the TP1 and the TP2 before the SSPS is initiated. And, although the TP2 receives an uplink signal from the UE immediately after the SSPS is initiated, no problem occurs on a reception power level.

TPC-related information includes at least one of a PUSCH-related parameter $\{(P_{CMAX,c}(i)), M_{PUSCH,c}(i), P_{O\_PUSCH,c}(j), \alpha_c(j), PL_c, \Delta_{TF,c}(i), f_c(i)\}$, a PUCCH-related parameter $\{P_{O\_PUCCH,c}(j), h(n_{CQI}, n_{HARQ}, n_{SR}), PL_c, g(i), \Delta_{F\_PUCCH}(F), \Delta_{TxD}(F')\}$ and an SRS-related parameter $\{P_{SRS\_OFFSET,c}(m), M_{SRS,c}\}$ mentioned earlier in Equation 7, 8 and 9.

It is preferable that the TP1 does not change the PC-related information until SSPS is terminated after the PC-related information is transmitted to the TP2. It is able to configure the TP2 to have power control authority only for uplink transmission of the UE during SSPS time section. As an example, although the TP1 is able to change such a TPC command of closed-loop modification as Fc(i) and g(i) all the time via a DCI, if the TP1 hands over power control authority related to the PUSCH, the PUCCH and/or the SRS to the TP2, the TP1 does not transmit a TPC command. If the TP2 has the PC authority during the SSPS time section, it is able to prevent a signaling mismatch from being occurred between the TP1 and the TP2.

According to one embodiment, {PUSCH PC process 1, PUCCH PC process 1 or SRS PC process 1} for UL of the TP1 and {PUSCH PC process 2, PUCCH PC process 2 or SRS PC process 2} for UL of the TP2 can be independently set to the UE. The TP2 sets a PC process of the TP2 for UL to the UE via schemes shown in Table 11 (e.g., via EPDCCH set 1) and may be then able to transit a TPC command (e.g., PUSCH TPC and/or PUCCH TPC).

Meanwhile, it is able to configure an open-loop PC to be performed based on a CSI-RS (or CRS) transmitted by the TP2. The TP2 can trigger the UE to transmit an aperiodic SRS (A-SRS) in a manner of transmitting DCI to the UE (e.g., via EPDCCH set 1). A periodic SRS (P-SRS) can be transmitted according to an SRS PC process 2.

14. Timing Advance (TA) Control-Related Information

In order for the TP2 to properly receive such an uplink signal as PUSCH, PUCCH, etc. from the UE, it is necessary to negotiate a TA control between the TP1 and the TP2 in advance via Xn-signaling. Before SSPS is initiated, only the TP1 can transmit a TA command itself. In this case, the TP1 transmits TA control-related information to the TP2 via Xn-signaling not only to make the TP1 consider a TA command for properly receiving a UL signal from the UE but also to make the TP2 obtain an uplink signal (e.g., SRS) of the UE in advance (e.g., SRS-related configuration information and periodic and/or aperiodic SRS transmission-related parameter information).

The TP2 delivers feedback for coordinating timing to the TP1 while overhearing the uplink signal (e.g., SRS) of the UE. In order to make both the TP1 and the TP2 receive the uplink signal of the UE, UL reception timing is configured. If SSPS is initiated in a state that UL timing of the UE is also aligned to the TP2, the TP2 can perform SSPS operations.

Meanwhile, in an embodiment that the TP2 directly transmits a DL grant via DCI (e.g., via EPDCCH set 1), the TP2 may have an authority capable of determining a DL RB assignment by the TP2. In this case, it may have a merit in that there is no restriction on an SSPS band and an SSPS time section promised between the TP1 and the TP2 for an SSPS operation.

In the aforementioned embodiments, information set to the UE by the TP1 via RRC can be directly signaled by the TP2 via RRC. According to a different embodiment, RRC signaling signaled to the UE can be configured as a unique authority of the TP1. The TP1 can perform RRC re-configuration during at least an SSPS time section and the TP1 can inform the TP2 of the RRC re-configuration via Xn-signaling in the middle of SSPS. Yet, ambiguity, which is resulted from a difference between latency of the RRC signaling and latency of the Xn-signaling, can be resolved in a manner of making updated RRC information to be applied after a specific time section is elapsed.

IV. SSPS Uplink Collision Handling

If the TP2 performs UL scheduling of the UE, there is a possibility of collision with UL scheduling of the TP1. Hence, a method of avoiding the collision is proposed. For example, if the TP1 transmits A-CSI triggering in a specific subframe (e.g., via EPDCCH set 1) and the TP1 transmits UL-related DCI (e.g., via EPDCCH set 0), resource allocation (RA) collision may occur between PUSCH transmissions transmitted by each DCI. This is because it is difficult to perform dynamic coordination due to an NIB characteristic between the TP1 and the TP2 and the TP2 (or TP1) is unaware of an RA field of DCI transmitted by the TP1 (or TP2).

In the following, a solution for collision between uplink transmissions, which is resulted from configuration/indication of independent uplink transmission (e.g., PUSCH, PUCCH and/or an SRS) received from a plurality of TPs, and an operation of the UE are explained. For clarity, an SSPS operation is explained as an example, by which the present invention may be non-limited. The present invention can also be applied to a collision control when general uplink transmission is performed.

1. Collision Handling Between PUSCH and PUSCH

This may correspond to a case that a UE receives two or more UL grants. For example, if the UL grants indicate UL transmission to be performed in an identical subframe or if at least a part of each RB assignment of the UL grants is collided with each other, a method of avoiding the collision is proposed.

1-1. Control Channel

The UE transmits PUSCH according to a UL grant only indicated by a specific control channel configuration and ignores other UL grants. There may exist priority in control channel configurations set to the UE. Examples of the priority of the control channel configurations are sequentially shown in the following.

i. Legacy PDCCH
ii. Legacy PDCCH on a predetermined search space (e.g., cell-specific or UE-specific search space (CSS or USS)
iii. EPDCCH set (e.g., EPDCCH set 0 or set 1)
iv. EPDCCH set (e.g., EPDCCH set 0 or set 1) on a predetermined search space (e.g., CSS or USS)

1-2. DCI Format

The UE transmits PUSCH according to a UL grant of a specific DCI format and ignores other UL grants. There may exist priority in DCI formats. Examples of the priority of the DCI formats are sequentially shown in the following.
i. DCI format 0
ii. DCI format 0 on CSS (or USS)
iii. DCI format 4
iv. DCI format 4 on CSS (or USS)
v. New UL-related DCI format
vi. New UL-related DCI format on CSS (or USS)

1-3. A-CSI-Only-Triggering DCI

The UE can handle A-CSI-only-triggering DCI as lowest priority. For example, assume that the A-CSI-only-triggering DCI is transmitted by the TP2 via an EPDCCH set 1 and a UL grant is transmitted by the TP1 via a legacy PDCCH. In this case, the UE drops the A-CSI-only-triggering DCI and transmits PUSCH according to the UL grant of the legacy PDCCH. In particular, the UE considers the A-CSI transmission as relatively less important and preferentially transmits UL data based on the UL grant. Meanwhile, the TP2 may attempt to transmit the dropped A-CSI triggering again. Although an A-CSI report is somewhat delayed, a serious impediment does not occur.

On the contrary, the UE may be able to handle the A-CSI-only-triggering DCI as highest priority. This can be comprehended as putting weight on enhancing efficiency of DL transmission of the TP2 according to SSPS. Although the TP1 retransmits a UL grant, the TP2 can promptly obtain an A-CSI report.

1-4. TP

Priority between TPs can be set to the UE via RRC. The UE transmits PUSCH to a TP of highest priority according to the priority between TPs. If the UE is able to transmit a plurality of PUSCHs at the same time, the UE transmits PUSCHs to N number of TPs of highest priority. PUSCH transmissions to the rest of TPs are all dropped. Priority of a TP can be determined by one of the followings.
i. TP index can be signaled to the UE via RRC.
ii. Among PUSCH DMRS configuration information signaled to the UE via RRC, PUSCH DMRS sequence scrambling initialization parameter can be used (e.g., VCI_PUSCH and/or VCI_CSH). For example, when the TP1 uses VCI_PUSCH1 and the TP2 uses VCI_PUSCH2, it is able to define or RRC configure that the VCI_PUSCH1 has priority higher than the VCI_PUSCH2. The UE transmits PUSCH to the TP1 preferentially using the VCI_PUSCH1.
iii. Priority of a TP can be determined via the aforementioned control channel configuration. For example, since EPDCCH set 1 is transmitted by the TP2, the TP2 can be determined as lowest priority.
iv. Priority of a TP can be determined via a PQI field. For example, assume that the TP1 transmits a first PQI field value and the TP2 transmits a second PQI field value. In this case, it is able to define/configure as the TP1 has priority higher than the TP2 in a manner of preferentially using the first PQI field value.
v. Priority of a TP can be determined via a relation between an RS index (e.g., NZP CSI-RS index) and a TP. For example, assume that the TP1 transmits a first NZP CSI-RS and the TP2 transmits a second NZP CSI-RS. In this case, it is able to determine as the TP1, which has transmitted the first NZP CSI-RS, has priority higher than the TP2. For example, the UE transmits PUSCH according to DCI including a PQI indicating the first NZP CSI-RS and drops PUSCH transmission according to a different DCI. In this case, it is able to previously define/configure that all DCIs received via legacy PDCCH of the TP1 correspond to a specific RS index (e.g., NZP CSI-RS index 0, etc.).

It is able to previously define or configure priority of applying the aforementioned 1-1 to 1-4 methods via RRC. For example, when 1-1-i and 1-2-i are competing with each other, the 1-1-i can be preferentially performed (a case of indicating a DCI format 0 via legacy PDCCH can be preferentially performed).

2. Collision Handling Between PUCCH/SRS and PUSCH

If a subframe in which PUCCH/SRS is transmitted and a subframe in which PUSCH is transmitted according to a UL grant are collided with each other or if RBs are collided with each other in a corresponding subframe, a method of handing the collision is proposed.

2-1. Case of Preferentially Transmitting PUCCH/SRS Compared to PUSCH

The UE drops PUSCH and transmits PUCCH and/or an SRS. For example, if the TP2 triggers A-CSI transmission, the UE should transmit PUSCH to report A-CSI. In this case, the TP2 is unaware of information on PUCCH transmission (e.g., P-CSI reporting according to P-CSI FB configuration) previously set to the UE by the TP1 or information on SRS transmission (e.g., SRS transmission of the UE according to SRS configuration). Hence, the A-CSI triggering of the TP2 and a PUCCH/SRS request of the TP1 can be collided with each other. In this case, the UE drops PUSCH for the TP2 and transmits PUCCH and/or SRS to the TP1. The TP2 can request PUSCH transmission again via a different RB assignment.

2-2. Case of Preferentially transmitting PUSCH Compared to PUCCH/SRS

In opposition to the method of 2-1, it may be able to preferentially transmit PUSCH. This method can be performed for a case of putting more weight on DL transmission efficiency of the TP2. Although this method has a demerit in that the UE attempts to transmit PUCCH/SRS again later, delay/latency of A-CSI report can be minimized.

Meanwhile, dropping PUCCH/SRS can be performed in an RB unit. For example, the UE can selectively drop an RB in which collision occurs only instead of dropping the whole of the PUCCH/SRS.

If PUSCH is collided with PUCCH but an SRS is not collided with the PUSCH, at least a partial RB of the PUCCH is dropped but the SRS is transmitted together with the PUSCH. On the contrary, if the SRS is collided with the PUSCH only, the PUCCH and the PUSCH can be transmitted together.

Meanwhile, according to a LTE standard regulation, it is unable to transmit PUSCH to a last symbol of a subframe in which an SRS is transmitted. Hence, it is necessary not to transmit PUSCH, which is transmitted together with the SRS, on a last (SC-FDMA) symbol(s) via a rate matching process.

Meanwhile, each TP can individually set a cell-specific SRS configuration or an SRS subframe configuration to the UE (RRC signaling). It is able to set a PUSCH DMRS sequence scrambling initialization parameter (e.g., {VCI_PUSCH(i), VCI_CSH(i)}) to the cell-specific SRS configuration (or the SRS subframe configuration) according to each TP. For example, the TP1 sets {VCI_PUSCH (1), VCI_CSH (1)} to a first cell-specific SRS configuration (or first SRS subframe configuration). The TP2 can set {VCI_PUSCH (2), VCI_CSH (2)} to a second cell-specific SRS configuration (or second SRS subframe configuration).

According to one embodiment, rate matching is not performed on a last (SC-FDMA) symbol of PUSCH in a subframe #n in the SRS subframe configuration associated with the VCI_PUSCH (1). In the SRS subframe configuration associated with the VCI_PUSCH (2), it is able to configure the rate matching to be performed on the last (SC-FDMA) symbol of PUSCH in the specific subframe #n. As mentioned above, it is able to avoid collision between PUSCH and SRS through an independent SRS subframe configuration.

2-1 can be comprehended as dropping of PUSCH when PUCCH/SRS is collided with PUSCH due to A-CSI-only-triggering. Besides the A-CSI-only-triggering, in case of scheduling PUSCH by a general uplink-related DCI, at least one of the methods described in 2-1 can be applied.

In case of putting more weight on DL transmission efficiency of the TP2, PUCCH and/or SRS is dropped and PUSCH can be transmitted via the A-CSI-only-triggering DCI. In this case, it is able to drop a collided one only among the PUCCH and/or the SRS.

2-3. Priority Between TPs

Priority between TPs can be set to the UE via RRC. The UE transmits PUCCH/SRS or PUSCH heading to a TP of highest priority according to the priority between TPs. All UL transmissions for the rest of TPs are dropped. Meanwhile, it is able to configure a combination capable of transmitting uplink together among the PUCCH/SRS and the PUSCH (e.g., PUSCH+PUCCH, PUSCH+SRS, PUCCH+SRS) to be transmitted together. In case of a combination incapable of transmitting uplink or capability of a UE incapable of transmitting uplink at the same time, uplink transmission of high priority is performed only according to priority between uplink transmissions (e.g., PUCCH>PUSCH>SRS, priority among PUCCH, PUSCH and SRS is defined/configured in advance) and the rest of uplink transmissions are dropped. In this case, regarding priority of a TP, it may refer to the explanation of 1-4.

The UE performs collision control via at least one of the aforementioned 2-1, 2-2 and 2-3 method. In this case, priority of the 2-1 to 2-3 methods can be defined in advance or configured via RRC.

3. Configuration of Usable Uplink Subframe Set

In the foregoing description, a method of processing an occurred collision is explained. In the following, a method of preventing collision from being occurred is proposed. It is able to individually configure an uplink subframe set capable of being used/scheduled according to each TP. A subframe capable of configuring/indicating uplink transmission can be differently configured according to each TP. For example, an UT SF set capable of being scheduled by the TP2 can be negotiated between the TP1 and the TP2 via Xn-signaling before SSPS is initiated. Or, the TP1 can request or indicate a subframe set capable of being used by the TP2 to the TP2. An UL SF set capable of being scheduled by the TP2 can be represented by a bitmap of T ms (e.g., T=40). The TP1 transmits the bitmap to the TP2. If the bitmap transmission of the TP1 corresponds to a request, the TP2 transmits a response for accepting the request to the TP1 or makes a request for a change to the TP1. If the bitmap transmission of the TP1 corresponds to an indication (e.g., TP1 corresponds to 'master'), the TP2 operates according to the bitmap. The TP2 can schedule such a DCI as the A-CSI triggering (via EPDCCH set and the like) in an SF index only corresponding to an activated bit in the bitmap related to the UL SF set. In particular, since an SF index capable of being scheduled by the TP2 is fixed and is known to the TP1, the TP1 transmits UL-related DCI to a different SF in a manner of avoiding the SF index. By doing so, it may avoid occurrence of collision. Meanwhile, the UL SF set-related information can be signaled via various Xn-signaling methods including not only the bitmap but also a period, offset and the like. The present invention may be non-limited by the aforementioned Xn-signaling methods.

And, a scheme of restricting an SF set capable of transmitting specific uplink transmission (e.g., PUCCH, PUSCH, and/or SRS) can be applied to UL transmission according to a HARQ process. For example, the TP1 requests (indicates) HARQ process ID set information capable of being used for PUSCH to the TP2 (Xn-signaling). Among the K number of HARQ process ID values (e.g., K=8), HARQ process ID values capable of being used by the TP2 can be restricted by the M number of HARQ process ID values (e.g., M=2, ID#3 and ID#5). The TP1 uses different HARQ process IDs rather than the M number of HARQ process ID(s).

4. PUCCH Type

PUCCH types are defined. A PUCCH type 1 is defined as a PUCCH type (e.g., PUCCH format 1a/1b, and/or a PUCCH format 3) for transmitting dynamically scheduled ACK/NACK and a PUCCH type 2 is defined as other PUCCH type (e.g., a PUCCH format 2 for a P-CSI FB report and/or semi-statistically scheduled ACK/NACK and the like). In the collision control schemes according to the aforementioned method 2, PUCCH may indicate the PUCCH type 1 or the PUCCH type 2. The aforementioned PUCCH types are just examples, by which the present invention may be non-limited. For example, it may be able to define different types such as a PUCCH type 3 and the like.

Explanation on the III-5 can be applied to every PUCCH type. For example, an independent VCI_PUCCH can be configured via RRC according to each PUCCH type and corresponding information is exchanged between TPs via Xn-signaling. In other word, a receiving TP may be different from each other depending on each PUCCH type. For example, it is able to configure the TP2 to be a receiving TP in a manner of associating the PUCCH type 1 with a VCI_PUCCH2.

It is preferable for the TP2 to directly receive ACK/NACK of the UE in response to PDSCH transmitted by the TP2. To this end, it is able to provide the UE with RRC signaling to make ACK/NACK of the PUCCH type 1 to be associated with VCI_PUCCH2 of the TP2. The ACK/NACK of the UE is transmitted to the TP2 via PUCCH generated by the VCI_PUCCH2.

5. Carrier Aggregation

The aforementioned collision control schemes can be applied to carrier aggregation (CA) environment. It is able to set priority to the UE via RRC signaling according to each component carrier (CC) index. For example, the priority is defined/configured in an order of a CC1, a CC2, . . . a CCn and the aforementioned schemes are applied. It may be able to make a priority condition according to a CC to be applied with highest priority or lowest priority. For example, a random CC index can be included in a CSI request field of UL-related DCI that indicates A-CSI triggering. It is able to transmit PUSCH according to a CSI request field including a CC index of highest priority and it is able to drop PUSCH according to the rest of CSI request fields.

As a different example, if collision occurs between a first UL grant by first cross-carrier scheduling and a second UL grant by second (non) cross-carrier scheduling, it is able to define/configure PUSCH to be transmitted according to a UL grant of high priority and the rest of PUSCH to be dropped.

And, if collision occurs between a UL grant scheduled by cross-carrier scheduling and PUCCH/SRS, it is able to define/configure one uplink transmission to be performed only and the rest of uplink transmissions to be dropped.

It is able to avoid occurrence of collision in a manner of requesting/negotiating/checking an SSPS RB area to which cooperative transmission such as SSPS and the like are applied between TPs corresponding to a target of the cooperative transmission and an SSPS time section via Xn-signaling. Yet, since resource waste occurs according to reservation of frequency/time resources, it is necessary to consider traffic load situation between TPs as well.

VI. Exemplary Embodiments

Examples for a method of performing an SSPS operation, an example of transmission points according to the SSPS operation and an example of a UE are disclosed based on the aforementioned explanation. The examples described in the following are just a part selected from various embodiments supported by the aforementioned explanation. It is apparent that the scope of the present invention is not restricted by the examples described in the following. In the examples described in the following, items described in the aforementioned various embodiments of the present invention can be independently applied or two or more embodiments can be applied at the same time. Explanation on overlapped contents is omitted.

Figure 16:
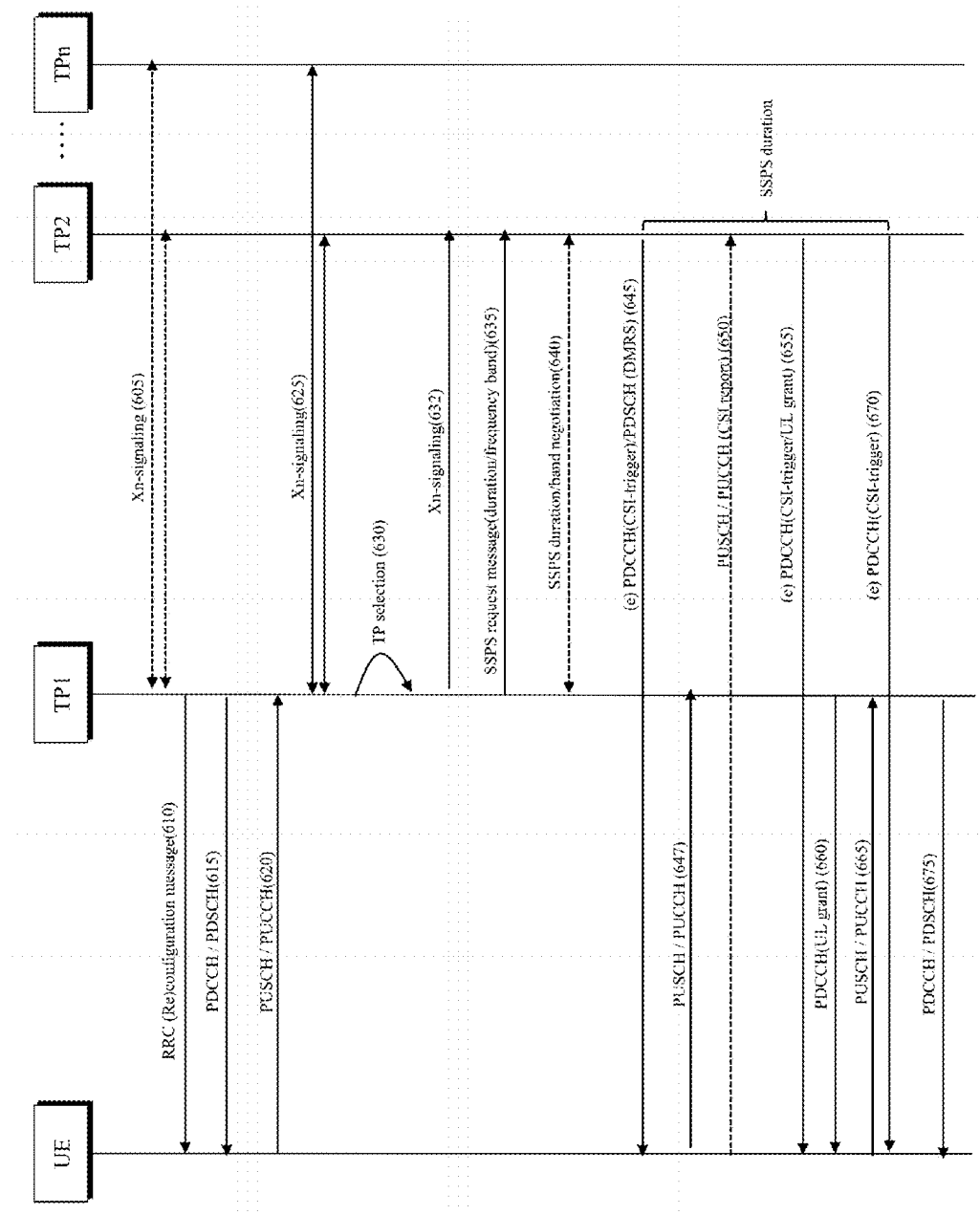
FIG. 16 is a flowchart for a method of performing an SSPS operation according to one embodiment of the present invention.

FIG. 16 is a flowchart for a method of performing an SSPS operation according to one embodiment of the present invention. For clarity, the exemplary method described in FIG. 16 is represented by a series of operations. Yet, an order of performing the steps may be non-limited by the method. If necessary, each of the steps can be performed at the same time or can be performed in a different order. And, it is not mandatory to have all steps described in the example of FIG. 16 to implement the method proposed by the present invention.

Referring to FIG. 16, a TP1 corresponds to a serving transmission point of a UE and a TP2 to a TPn correspond to candidate transmission points participating in an SSPS operation. Hence, total n numbers of transmission points including the TP1 are participating in the SSPS operation.

The TP1 transmits an RRC configuration or reconfiguration message to the UE via RRC signaling [610]. Meanwhile, the TP1 can collect necessary information from candidate TPs via Xn-signaling before RRC (re)configuration is established with the UE. For example, the TP1 can obtain at least one of load information of the candidate TPs, CSI-RS configuration used by the candidate TPs, CSI-IM configuration, and downlink DMRS configuration via Xn-signaling [605]. And, when RRC (re)configuration is performed, the TP1 is able to set Xn signaling information collected from the candidate TPs to the UE.

Before SSPS is initiated, the TP1 is in charge of transmitting PDCCH and/or PDSCH [615] and receiving PUSCH and/or PUCCH [620].

While the TP1 performs Xn signaling with the candidate transmission points [625], if the TP1 determines that an SSPS operation is necessary, the TP1 selects a TP2 to transmit PDSCH [630]. The TP1 can select the TP2 based on information on traffic load of the candidate TPs collected from the candidate TPs Before the SSPS is initiated, the TP1 transmits prescribed Xn signaling information to the TP2 in a manner of performing Xn signaling [632]. For example, the prescribed Xn signaling information can include at least a part of the RRC (re)configuration information set to the UE by the TP1 via RRC signaling [610]. For example, the TP1 can transmit at least one of periodic or aperiodic channel state information (CSI) feedback configuration set to the UE via radio resource control (RRC) signaling, physical uplink control channel (PUCCH) configuration, uplink demodulation reference signal (DMRS) configuration, channel state information (CSI) process configuration, PDSCH RE mapping and quasi co-location indicator (PQI) field configuration and C-RNTI of the UE to the TP2.

In order to initiate the SSPS, the TP1 transmits a message to request for transmitting physical downlink shared channel (PDSCH) to the UE to the TP2 [635]. The message can include information indicating time section (duration) for which the PDSCH is transmitted by the TP2 and information indicating a frequency band.

According to one embodiment, the TP1 and the TP2 can determine a length and a position of the duration or the frequency band in a manner of negotiating with each other [640].

If the SSPS is initiated, the TP can transmit the PDSCH to the UE during the SSPS duration [645]. In this case, the TP2 can code or schedule the PDSCH using at least a part of the RRC configuration information previously obtained from the TP1. And a downlink DMRS based on the DMRS configuration can be mapped to a region of the PDSCH during the SSPS duration. In this case, the DMRS configuration may correspond to configuration transmitted to the TP1 by the TP2 and set to the UE by the TP1 via RRC before the SSPS is initiated.

Meanwhile, the TP2 can transmit (e)PDCCH to the UE as well [645]. For example, a specific EPDCCH set among a plurality of evolved physical downlink control channel (EPDCCH) sets set to the UE can be assigned to the TP2 during the SSPS duration. In this case, the specific EPDCCH set assigned to the UE can be used for scheduling the PDSCH by the TP2 or triggering an aperiodic channel state information (CSI) report.

The TP2 can obtain a periodic or an aperiodic report of the UE based on the CSI feedback configuration [650]. And, the PDSCH, which is transmitted by the TP2, can be coded or scheduled based on a CSI report during the SSPS duration.

Meanwhile, although the SSPS is initiated, the TP1 can receive PUSCH and/or PUCCH from the UE [647].

First uplink transmission according to an uplink grant by the TP1 [660] and second uplink transmission according to triggering of an aperiodic CSI report by the TP2 [655] can be competed with each other during the SSPS duration. In this case, the UE preferentially performs the first uplink transmission [665]. Hence, the TP2 transmits the triggering of the aperiodic CSI report again [670].

If the SSPS duration is expired, the TP1 can transmit the PDSCH, which is used to be transmitted by the TP2 [675].

And, after the SSPS duration is expired, the TP1 can reselect a prescribed TP for transmitting the PDSCH, which is used to be transmitted by the TP2, from candidate TPs.

Figure 17:
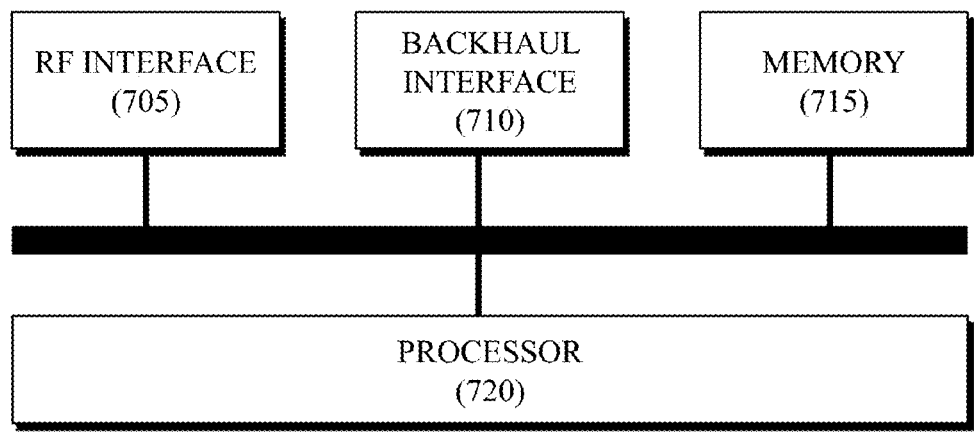
FIG. 17 illustrates a transmission point according to one embodiment of the present invention.

FIG. 17 illustrates a transmission point according to one embodiment of the present invention. The transmission point 70 shown in FIG. 17 can operate as the aforementioned TP1 or the TP2.

First of all, a case that the transmission point 70 operates as the TP1 is explained. If the transmission point operates as the TP1, an RF (radio frequency) interface 705 transceives a radio signal with a UE served by the transmission point 70. A backhaul interface transceives a backhaul link signal (e.g., Xn signaling information) with one or more candidate transmission points participating in multi-point coordination. A processor 720 selects the TP2 from the candidate transmission points. The processor 720 controls the backhaul interface 710 to transmit a message to request for transmitting physical downlink shared channel (PDSCH) to the UE served by the transmission point 70 to the TP2. In this case, the message can indicate time section (duration) for which the PDSCH is transmitted by the TP2. A memory 715 records a program code executed by the processor 720.

Subsequently, a case that the transmission point 70 operates as the TP2 is explained. The backhaul interface 710 receives at least a part of the RRC configuration set to the UE served by the TP1 from the TP1. The backhaul interface 710 receives a message to request for transmitting physical downlink shared channel (PDSCH) to the UE from the TP1. The RF (radio frequency) interface 705 transmits the PDSCH to the UE based on at least a part of the RRC configuration during the duration indicated by the message. The processor 720 controls the RF (radio frequency) interface 705 and the backhaul interface 710. The memory 715 records a program code executed by the processor 720.

Figure 18:
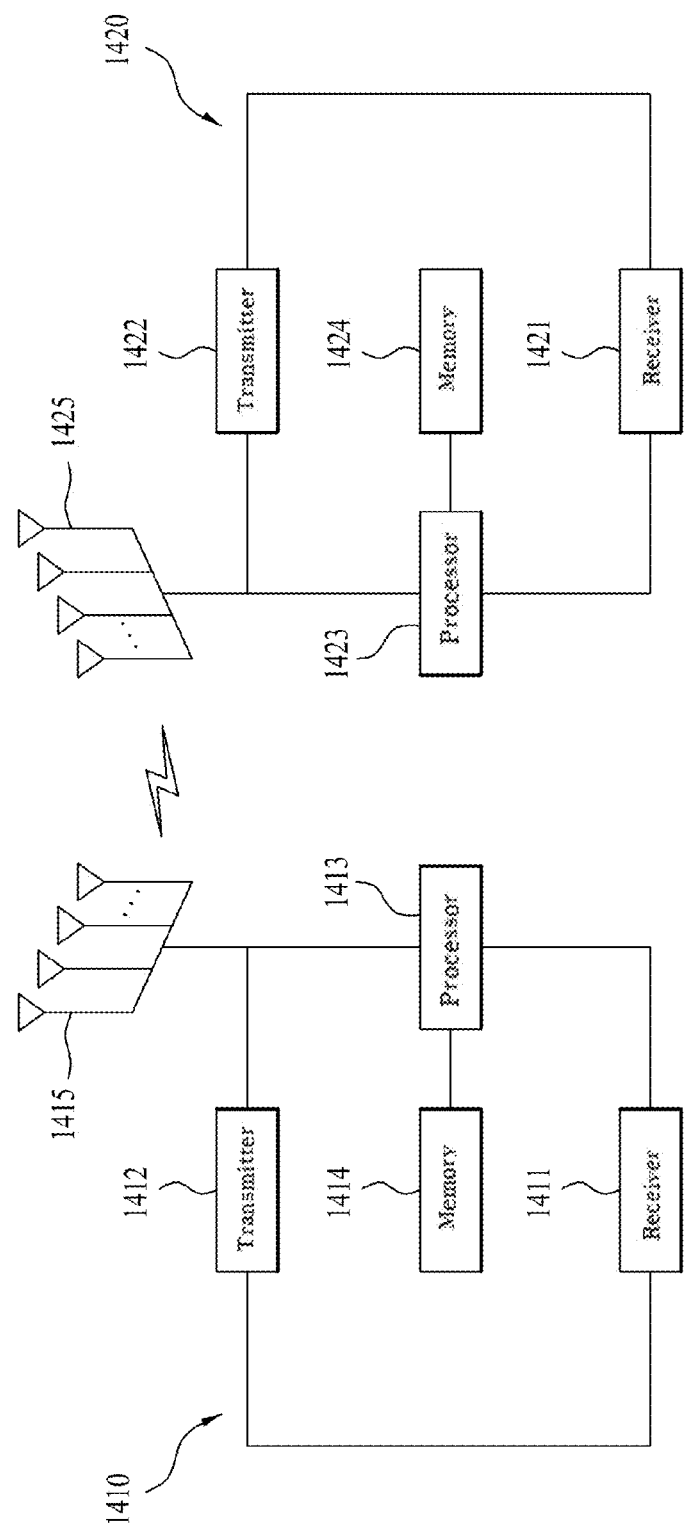
FIG. 18 illustrates a user equipment and a base station according to a different embodiment of the present invention.

FIG. 18 illustrates a user equipment and a base station according to a different embodiment of the present invention. The user equipment and the base station shown in FIG. 18 can respectively perform operations of the UE and the base station (transmission point) mentioned earlier in the aforementioned embodiments. A base station 1410 may include a receive module 1411, a transmit module 1412, a processor 1413, a memory 1414, and a plurality of antennas 1415. The antennas 1415 represent a base station that supports MIMO transmission and reception. The receive module 1411 may receive various signals, data and information from a UE on an uplink. The transmit module 1412 may transmit various signals, data and information to a UE on a downlink. The processor 1413 may control overall operation of the base station 1410.

Besides, the processor 1413 of the base station 1410 may function to operationally process information received by the base station 1410 or information to be transmitted from the base station 1410, and the memory 1414, which may be replaced with an element such as a buffer (not shown), may store the processed information for a predetermined time.

A UE 1420 may include a receive module 1421, a transmit module 1422, a processor 1423, a memory 1424, and a plurality of antennas 1425. The antennas 1425 represent the UE that supports MIMO transmission and reception. The receive module 1421 may receive various signals, data and information from a base station on a downlink. The transmit module 1422 may transmit various signals, data and information to a base station on an uplink. The processor 1423 may control overall operation of the UE 1420.

Besides, the processor 1423 of the UE 1420 may function to operationally process information received by the UE 1420 or information to be transmitted from the UE 1420, and the memory 1424, which may be replaced with an element such as a buffer (not shown), may store the processed information for a predetermined time.

The configurations of the base station and the UE as described above may be implemented such that the above-described embodiments can be independently applied or two or more thereof can be simultaneously applied, and description of redundant parts is omitted for clarity.

Description of the base station 1410 in FIG. 18 may be equally applied to a relay as a downlink transmission entity or an uplink reception entity, and description of the UE 1420 may be equally applied to a relay as a downlink reception entity or an uplink transmission entity.

In explaining various embodiments of the present invention, a downlink transmission entity or an uplink reception entity is mainly explained with an example of a base station and a downlink reception entity or an uplink transmission entity is mainly explained with an example of a UE, by which the scope of the present invention may be non-limited. For example, description of the base station may be equally applied to a case that a cell, an antenna port, an antenna port group, an RRH, a transmission point, a reception point, an access point, a relay or the like becomes a downlink transmission entity to a UE or an uplink reception entity from a UE. And, when a relay becomes a downlink transmission entity to a UE or an uplink reception entity from a UE or when a relay becomes an uplink transmission entity to a base station or a downlink reception entity from a base station, the principle of the present invention, which is explained via various embodiments of the present invention, can be equally applied.

The embodiments of the present invention may be implemented through various means. For example, the embodiments can be implemented by hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method of performing coordinated multi-point operation by a first transmission point based on transmission point selection, the method comprising:
    selecting a second transmission point from one or more candidate transmission points participating in the coordinated multi-point; and
    transmitting, to the second transmission point, a message for requesting to transmit a physical downlink shared channel (PDSCH) to a user equipment served by the first transmission point,
    wherein the message indicates a duration in which the PDSCH is transmitted by the second transmission point.

2. The method of claim 1, further comprising: reselecting a transmission point for transmitting the PDSCH which was transmitted by the second transmission point from the candidate transmission points, after the duration is expired.

3. The method of claim 1, further comprising: transmitting, by the first transmission point, the PDSCH which was transmitted by the second transmission point, according to the expiration of the duration.

4. The method of claim 1, wherein:
    the message comprises at least a part of radio resource control (RRC) configuration information configured in the user equipment by the first transmission point via RRC signaling and
    the PDSCH is coded or scheduled using the at least a part of the RRC configuration information.

5. The method of claim 1, further comprising:
    receiving a demodulation reference signal (DMRS) configuration from the second transmission point; and
    configuring the received DMRS configuration to the user equipment via RRC signaling,
    wherein a downlink DMRS based on the DMRS configuration is mapped to a region of the PDSCH during the duration.

6. The method of claim 1, wherein:
    the message is transmitted via a backhaul interface between the first transmission point and the second transmission point and
    a size of transmission latency of the backhaul interface is smaller than a size of transmission latency according to RRC signaling for the user equipment.

7. The method of claim 1, further comprising: transmitting, to the second transmission point, information on periodic or aperiodic channel state information (CSI) feedback configuration configured in the user equipment by the first transmission point via radio resource control (RRC) signaling.

8. The method of claim 7, wherein the PDSCH is coded or scheduled by the second transmission point which has obtained a CSI report of the user equipment based on the CSI feedback configuration, during the duration.

9. The method of claim 1, wherein a specific evolved physical downlink control channel (EPDCCH) set among a plurality of EPDCCH sets configured in the user equipment, is assigned to the second transmission point during the duration.

10. The method of claim 9, wherein the specific EPDCCH set assigned to the second transmission point is used for scheduling the PDSCH scheduled by the second transmission point or triggering an aperiodic channel state information (CSI) report.

11. The method of claim 10, wherein if first uplink transmission according to an uplink grant by the first transmission point and second uplink transmission according to the triggering of the aperiodic CSI report by the second transmission point are competed with each other during the duration, the first uplink transmission is preferentially performed.

12. The method of claim 1, wherein the selecting of the second transmission point comprises selecting the second transmission point based on information on a traffic load of the candidate transmission points collected from the candidate transmission points.

13. The method of claim 1, further comprising: determining a length and a position of the duration via negotiation with the second transmission point.

14. The method of claim 1, further comprising: transmitting, to the second transmission point, at least one of a physical uplink control channel (PUCCH) configuration configured in the user equipment via RRC, a uplink demodulation reference signal (DMRS) configuration, a uplink power control configuration, a timing advance (TA) control configuration, a channel state information (CSI) process configuration and a PDSCH RE mapping and quasi co-location indicator (PQI) field configuration.

15. A method of performing coordinated multi-point operation by a second transmission point based on transmission point selection, comprising:
    receiving, from the first transmission point, at least a part of a radio resource control (RRC) configuration configured in a user equipment served by a first transmission point;
    receiving, from the first transmission point, a message for requesting to transmit a physical downlink shared channel (PDSCH) to the user equipment; and
    transmitting the PDSCH to the user equipment based on the at least a part of the RRC configuration during a duration indicated by the message.

16. The method of claim 15,
    wherein the receiving the at least a part of the RRC configuration comprises receiving a demodulation reference signal (DMRS) configuration configured in the user equipment and
    wherein the transmitting the PDSCH to the user equipment comprises transmitting a downlink DMRS generated based on the DMRS configuration, via a region of the PDSCH.

17. The method of claim 15, wherein the receiving the at least a part of the RRC configuration comprises receiving periodic or aperiodic channel state information (CSI) configuration configured in the user equipment and
    wherein the PDSCH is coded or scheduled based on a CSI report obtained from the user equipment using the CSI configuration.

18. A transmission point performing coordinated multi-point operation based on transmission point selection, comprising:
    a radio frequency (RF) interface configured to transceive a radio signal with a user equipment served by the transmission point;
    a backhaul interface configured to transceive a backhaul link signal with one or more candidate transmission points participating in the coordinated multi-point; and
    a processor configured to control the backhaul interface to select a prescribed transmission point from the candidate transmission points and transmit a message for requesting to transmit a physical downlink shared channel (PDSCH) to the user equipment to the prescribed transmission point, wherein the message indicates a duration in which the PDSCH is transmitted by the prescribed transmission point.

19. A transmission point performing coordinated multi-point operation based on transmission point selection, comprising:
a backhaul interface configured to receive at least a part of a radio resource control (RRC) configuration configured in a user equipment served by a prescribed transmission point from the prescribed transmission point and receive a message for requesting to transmit a physical downlink shared channel (PDSCH) to the user equipment from the prescribed transmission point; and
a radio frequency (RF) interface configured to transmit the PDSCH to the user equipment based on the at least a part of the RRC configuration during a duration indicated by the message.

* * * * *